United States Patent
Yang et al.

(10) Patent No.: US 11,276,414 B2
(45) Date of Patent: Mar. 15, 2022

(54) METHOD AND DEVICE FOR PROCESSING AUDIO SIGNAL USING AUDIO FILTER HAVING NON-LINEAR CHARACTERISTICS TO PREVENT RECEIPT OF ECHO SIGNAL

(71) Applicant: Samsung Electronics Co., Ltd., Gyeonggi-do (KR)

(72) Inventors: Jaemo Yang, Gyeonggi-do (KR); Hangil Moon, Daejeon (KR); Soonho Baek, Seoul (KR); Beak-Kwon Son, Gyeonggi-do (KR); Kiho Cho, Gyeonggi-do (KR); Chulmin Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 16/639,332

(22) PCT Filed: Aug. 30, 2018

(86) PCT No.: PCT/KR2018/010038
§ 371 (c)(1),
(2) Date: Feb. 14, 2020

(87) PCT Pub. No.: WO2019/045474
PCT Pub. Date: Mar. 7, 2019

(65) Prior Publication Data
US 2020/0251119 A1 Aug. 6, 2020

(30) Foreign Application Priority Data
Sep. 4, 2017 (KR) .................. 10-2017-0112714

(51) Int. Cl.
*G10L 19/26* (2013.01)
*G10L 21/0208* (2013.01)
(Continued)

(52) U.S. Cl.
CPC .......... *G10L 19/26* (2013.01); *G10L 21/0208* (2013.01); *G10L 21/0272* (2013.01); *G10L 25/30* (2013.01); *G10L 2021/02082* (2013.01)

(58) Field of Classification Search
CPC . G10L 19/26; G10L 21/0208; G10L 21/0272; G10L 25/30; G10L 2021/02082; H04M 9/082
See application file for complete search history.

(56) References Cited

U.S. PATENT DOCUMENTS 6,307,500 B1 * 10/2001 Cornman ............... G01S 13/951
342/26 R
8,213,598 B2 * 7/2012 Bendersky ............... H04B 3/23
379/406.14
(Continued)

FOREIGN PATENT DOCUMENTS

KR 10-0860805 B1 9/2008
KR 10-2013-0127597 A 11/2013

OTHER PUBLICATIONS

Hoshuyama, et al.; "An Acoustic Echo Suppressor Based on a Frequency-Domain Model of Highly Nonlinear Residual Echo"; 2006; NEC Corporation; Japan.
(Continued)

*Primary Examiner* — Michael N Opsasnick
(74) *Attorney, Agent, or Firm* — Cha & Reiter, LLC

(57) ABSTRACT

An electronic device includes an audio input module, an audio output module, and a processor. The processor is configured to provide a first signal and a second signal into which a first audio signal is processed, output the first audio signal through the audio output module, acquire an external audio signal comprising the first audio signal of the electronic device, acquire a first output value through a first input channel of an audio filter, acquire a second output value through a second input channel of the audio filter, and
(Continued)

provide a second audio signal, based at least on a first difference value between the magnitude value corresponding to the first frequency of the external audio signal and the first output value and a second difference value between the magnitude value corresponding to the second frequency of the external audio signal and the second output value.

20 Claims, 19 Drawing Sheets

(51) Int. Cl.
  *G10L 21/0272* (2013.01)
  *G10L 25/30* (2013.01)

(56) References Cited

U.S. PATENT DOCUMENTS

| | | | |
|---|---|---|---|
| 2004/0057586 A1 | 3/2004 | Licht | |
| 2004/0213415 A1* | 10/2004 | Rama | H04R 25/554 |
| | | | 381/63 |
| 2006/0222172 A1 | 10/2006 | Chhetri et al. | |
| 2009/0046847 A1 | 2/2009 | Wu et al. | |
| 2009/0214048 A1 | 8/2009 | Stokes, III et al. | |
| 2015/0126255 A1 | 5/2015 | Yang et al. | |
| 2015/0341501 A1 | 11/2015 | Lu et al. | |
| 2016/0203828 A1* | 7/2016 | Gomez | G10L 15/20 |
| | | | 704/226 |
| 2016/0358602 A1* | 12/2016 | Krishnaswamy | G10L 15/20 |
| 2016/0358619 A1* | 12/2016 | Ramprashad | G10L 15/20 |
| 2017/0278519 A1* | 9/2017 | Visser | G01S 5/18 |
| 2018/0033449 A1* | 2/2018 | Theverapperuma | G10L 25/84 |
| 2018/0040333 A1* | 2/2018 | Wung | G10L 21/0232 |

OTHER PUBLICATIONS

Fu, et al.; "A Nonlinear Acoustic Echo Canceller Using Sigmoid Transform in Conjunction With RLS Algorithm"; 2008 IEEE Transactions on Circuits and Systems II: Express Briefs.

Lee, et al.; "DNN-based Residual Echo Suppression"; Sep. 6-10, 2015; Germany.

Lee, "Enhanced Acoustic Echo Suppression Techniques Based on Spectro-Temporal Correlations"; Seoul National University Graduate School, Department of Electrical and Computer Engineering; Sep. 2016.

Korean Search Report dated Dec. 27, 2021.

* cited by examiner

METHOD AND DEVICE FOR PROCESSING AUDIO SIGNAL USING AUDIO FILTER HAVING NON-LINEAR CHARACTERISTICS TO PREVENT RECEIPT OF ECHO SIGNAL

CLAIM OF PRIORITY

This application is a National Phase Entry of PCT International Application No. PCT/KR2018/010038, which was filed on Aug. 30, 2018 and claims a priority to Korean Patent Application No. 10-2017-0112714, which was filed on Sep. 4, 2017, the contents of which are incorporated herein by reference.

TECHNICAL FIELD

Various embodiments relate to a signal processing method and electronic device for removing an echo signal being a sound that is again introduced into the electronic device after being reproduced by the electronic device.

BACKGROUND ART

An electronic device provides various calling schemes in a communication environment with another electronic device. For example, the electronic device provides a speaker phone call and/or a video call. In this calling scheme, the electronic device outputs, through a speaker, a sound signal received from the another electronic device. The outputted sound signal may be again introduced into the electronic device through a microphone of the electronic device. In other words, the electronic device may receive an echo signal (i.e., reverberation signal) that is the sound signal outputted through the speaker. The echo signal is a main cause of deteriorating a sound quality. Accordingly, the electronic device removes the echo signal by using a signal processing technique (e.g., echo cancellation) configured to remove the echo signal at calling.

DISCLOSURE OF INVENTION

Technical Problem

A feed-back modeled to remove a reverberation signal (or echo signal) of an electronic device has an attribute of linearity. Meantime, the reverberation signal can include a non-linear signal provided through an element, etc. of the electronic device. In this case, the modeled feed-back removes only a linear component of the echo signal, and there is a problem that it is difficult to remove the non-linear signal of the echo signal.

Various embodiments may provide an electronic device and method for modeling a non-linear signal among an echo component introduced into the electronic device, based on non-linear modeling, to remove the non-linear signal.

Various embodiments may provide an electronic device and method for removing a non-linear signal introduced into the electronic device, based on a filter having an attribute of non-linearity and a filter having an attribute of a neural network.

Solution to Problem

In various embodiments, an electronic device may include an audio input module, an audio output module, and a processor. The processor may be configured to identify a first audio signal that will be outputted through the audio output module, and provide a first signal into which the first audio signal is processed by using a first filter having a first attribute of non-linearity and a second signal into which the first audio signal is processed by using a second filter having a second attribute of non-linearity, and output the first audio signal through the audio output module, acquire an external audio signal comprising the first audio signal of the electronic device, through the audio input module, and acquire a first output value through a first input channel of an audio filter in which a first weight having a first non-linear characteristic is applied to a magnitude value corresponding to a first frequency among the first signal and a magnitude value corresponding to the first frequency among the second signal, acquire a second output value through a second input channel of the audio filter in which a second weight having a second non-linear characteristic, distinct from the first weight, is applied to a magnitude value corresponding to a second frequency among the first signal and a magnitude value corresponding to the second frequency among the second signal, and provide a second audio signal, based at least on a first difference value between the magnitude value corresponding to the first frequency of the external audio signal and the first output value and a second difference value between the magnitude value corresponding to the second frequency of the external audio signal and the second output value.

In various embodiments, a method of an electronic device may include identifying a first audio signal that will be outputted through an audio output module, and providing a first signal into which the first audio signal is processed by using a first filter having a first attribute of non-linearity and a second signal into which the first audio signal is processed by using a second filter having a second attribute of non-linearity, and outputting the first audio signal through the audio output module, and acquiring an external audio signal comprising the first audio signal of the electronic device, through an audio input module, and acquiring a first output value through a first input channel of an audio filter in which a first weight having a first non-linear characteristic is applied to a magnitude value corresponding to a first frequency among the first signal and a magnitude value corresponding to the first frequency among the second signal, and acquiring a second output value through a second input channel of the audio filter in which a second weight having a second non-linear characteristic, distinct from the first weight, is applied to a magnitude value corresponding to a second frequency among the first signal and a magnitude value corresponding to the second frequency among the second signal, and providing a second audio signal, based at least on a first difference value between the magnitude value corresponding to the first frequency of the external audio signal and the first output value and a second difference value between the magnitude value corresponding to the second frequency of the external audio signal and the second output value.

In various embodiments, an electronic device may include an audio input module, an audio output module, a memory storing instructions, and at least one processor. The at least one processor may be configured to execute the stored instructions so as to output a first audio signal through the audio output module, and model the first audio signal through a non-linear filter, based on an attribute of non-linearity, and model the first audio signal modeled based on the attribute of non-linearity, into a second audio signal, based on an attribute of linearity, through a linear filter, and model the first audio signal modeled based on the attribute of non-linearity, into a third audio signal through a neural network, and, in response to receiving an external audio signal related with the first audio signal through the audio input module, process the received external audio signal, based on the second audio signal and the third audio signal.

Advantageous Effects of Invention

According to various embodiments, the electronic device and an operation method thereof according to various embodiments may effectively remove an echo signal that a sound reproduced with a speaker is again introduced into a microphone in the electronic device including the speaker and the microphone.

According to various embodiments, the electronic device may forward only a target voice signal at voice recognition or calling of the electronic device, through effective echo signal removal, to more improve a voice recognition function, and prevent a deterioration of a sound quality beforehand.

According to various embodiments, the electronic device may real-time model and remove a non-linear signal among an echo component.

According to various embodiments, the electronic device may remove non-linearity provided in a speaker and a microphone, to improve non-linear modeling performance through modeling that uses a plurality of non-linear attribute filters (or sigmoid functions) having mutually different features.

According to various embodiments, the electronic device may improve non-linear modeling performance by using a filter having an attribute of a neural network at a frequency axis for a non-linear echo modeled by a plurality of non-linear attribute filters (i.e., sigmoid functions). According to various embodiments, the electronic device may minimize connection between a node of a neural network and a node while improving the non-linear modeling performance, to reduce real-time operation amount and memory use.

An effect that may be obtained from the present invention is not limited to the effects mentioned above, and other effects not mentioned would be able to be apparently understood from the above statement by a person having ordinary skill in the art to which the present disclosure pertains.

BEST MODE FOR CARRYING OUT THE INVENTION

Figure 1:
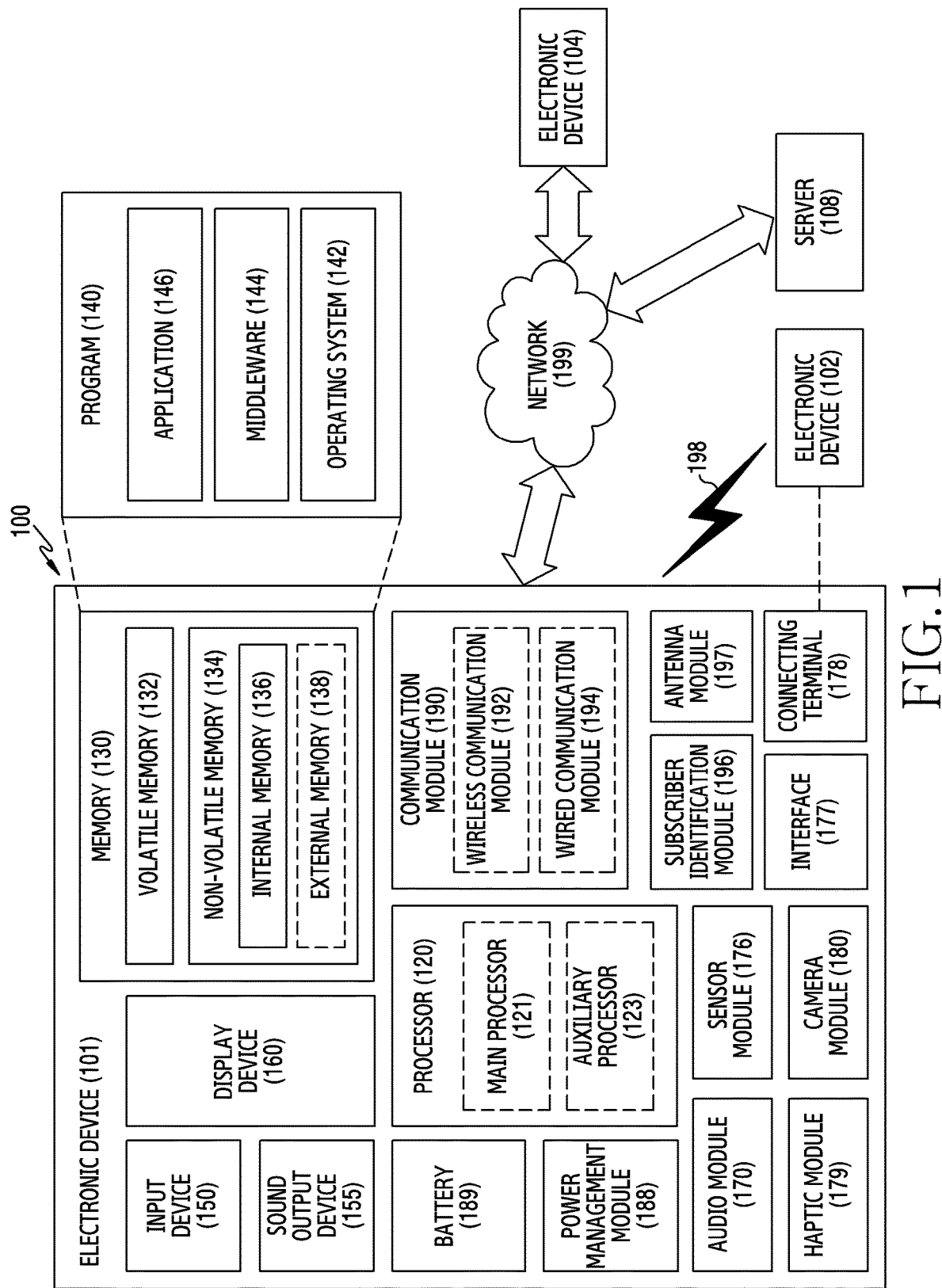
FIG. 1 is a block diagram of an electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
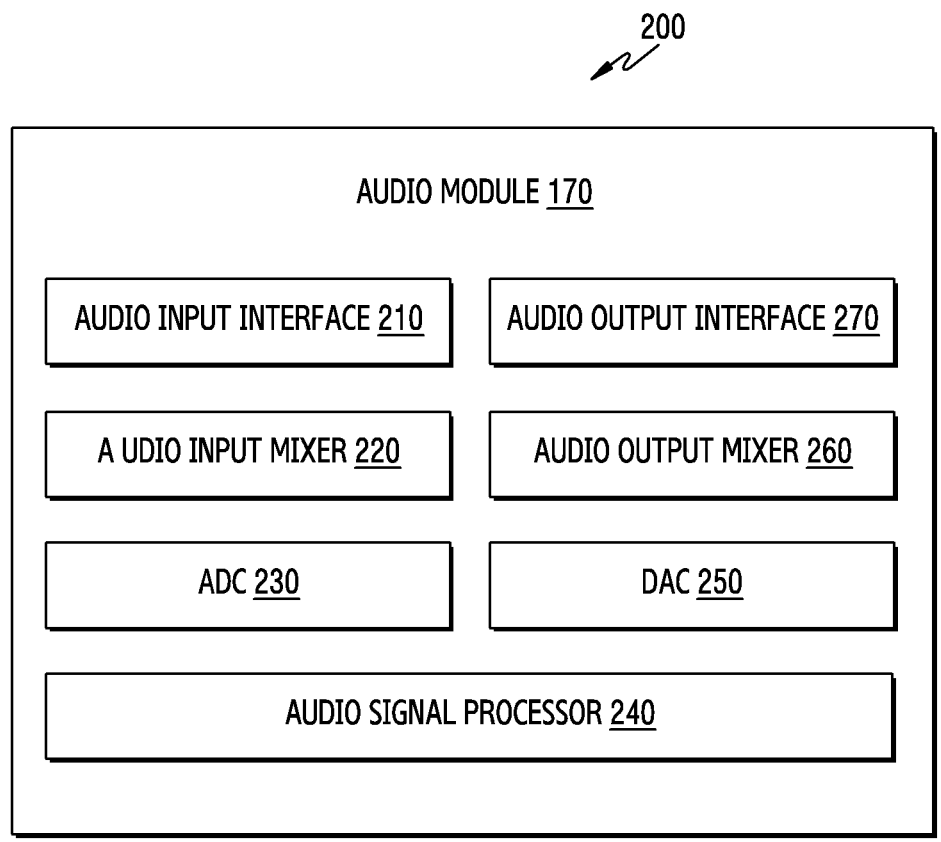
FIG. 2 is a block diagram of an audio module according to various embodiments.

FIG. 2 is a block diagram 200 illustrating the audio module 170 according to an embodiment of the disclosure.

Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input device 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal. The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output device 155. The sound output device 155 may include, for example, a speaker, such as a dynamic driver or a balanced armature driver, or a receiver. According to an embodiment, the sound output device 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
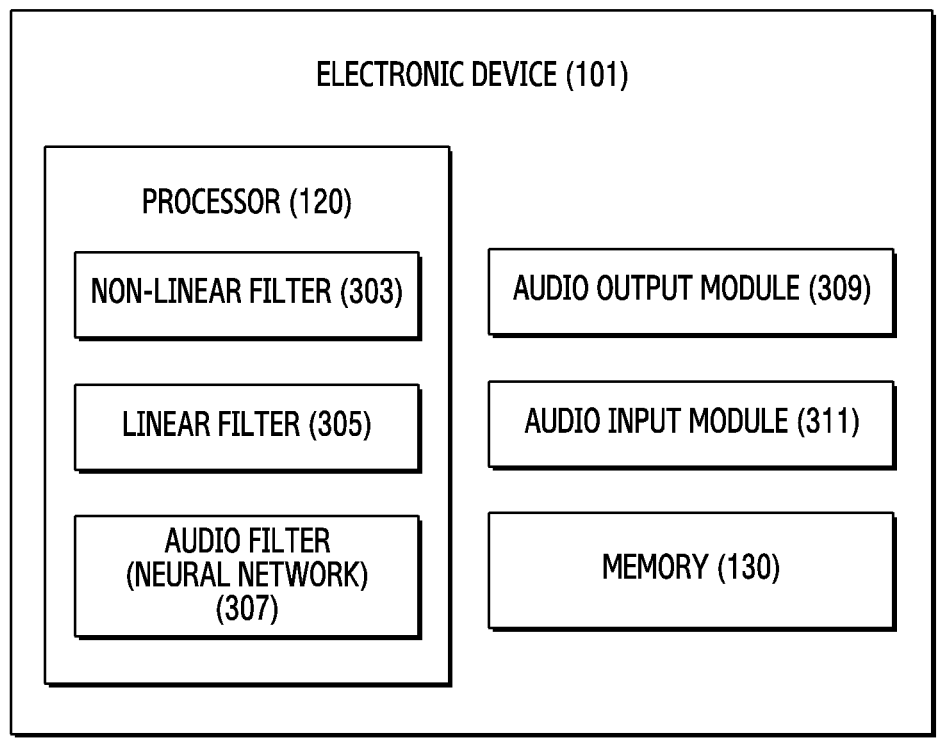
FIG. 3 illustrates an example of a functional construction of an electronic device according to various embodiments.

FIG. 3 illustrates an example of a functional construction of the electronic device 101 according to various exemplary embodiments.

The term denoting a signal processing scheme (e.g., modeling, filtering), the term denoting a signal, the term (e.g., a non-linear filter, a linear filter and/or an audio filter) denoting a constituent element of a device, etc. used in the following description are exemplified for description convenience's sake. Accordingly, the present disclosure is not limited to the terms described later, and may use other terms having equivalent technological meanings.

The term '... unit', etc. used below signifies the unit of processing at least one function or operation. This may be implemented by hardware, software or a combination of hardware and software. In various embodiments, a non-linear filter 303, a linear filter 305, and/or an audio filter (i.e., a neural network) 307 may be included as hardware modules in the processor 120, or be included as software modules.

Referring to FIG. 3, the electronic device 101 may include the processor 120, an audio output module 309, an audio input module 311, and the memory 130. The processor 120, the audio output module 309, the audio input module 311 and the memory 130 may be coupled to one another. For example, at least 10 some of the processor 120, the audio output module 309, the audio input module 311 and the memory 130 may be directly connected to one another. For another example, at least some of the processor 120, the audio output module 309, the audio input module 311 and the memory 130 may be indirectly connected to one another through another device or circuitry.

In various embodiments, the processor 120 may include the non-linear filter 303, the linear filter 305 and/or the audio filter (or neural network) 307. The non-linear filter 303, the linear filter 305 and/or the audio filter (or neural network) 307 may be coupled to one another. At least one of the non-linear filter 303, the linear filter 305 and/or the audio filter (or neural network) 307 may be indirectly or directly connected with at least one of the audio output module 309, the audio input module 311 and the memory 130.

In various embodiments, the processor 120 may be configured to execute instructions stored in the memory 130 in order to execute a function of at least one constituent element included in the electronic device 101. For example, the processor 120 may be configured to execute the stored instructions in order for the audio output module 309 to output an audio signal. For another example, the processor 120 may be configured to execute the stored instructions in order for the audio input module 311 to receive an external audio signal. For further example, the processor 120 may be configured to execute the stored instructions in order for the non-linear filter 303, the linear filter 305 and/or the audio filter 307 to process a signal.

In various embodiments, the processor 120 may receive an audio signal from the audio output module 309. The audio signal may include a signal (e.g., an audio reproduction signal) provided in the electronic device 101 or a signal (e.g., a voice signal received from another electronic device whose line is engaged) received from an external device. In some embodiments, the audio signal may include a signal received from the another electronic device through the communication module 190 included in the electronic device 101. The audio signal may include a signal transmitted from the another electronic device in a wireless or wired communication environment.

In various embodiments, the audio output module 309 may decode, through a decoder, a signal received to the electronic device 101 or provided from the electronic device 101. The decoded signal may include a form of a voice waveform. The decoded signal may be a digital signal. Information about the decoded signal may be stored in the memory 130 of the electronic device 101. The audio output module 309 may buffer the decoded signal in order to previously compensate a delay between the decoded signal and a signal that will be received through the audio input module 311. The audio signal may include the decoded signal.

In various embodiments, the audio output module 309 may include at least some of the DAC 250, the audio output mixer 260, the sound output device 155, and/or the audio output interface 270. The audio output module 309 may output (or reproduce) the audio signal through the sound output device 155 and/or the audio output interface 270. The outputted audio signal may be a signal converted into an analog signal. The outputted audio signal may be recognized through a user of the electronic device 101.

In various embodiments, the audio input module 311 may include at least some of the ADC 230, the audio input mixer 220, the input device 150, and/or the audio input interface 210. The audio input module 311 may perform various functions for receiving an audio signal from the external and identifying the received audio signal.

In various embodiments, the audio input module 311 may again receive, to the electronic device 101, at least a part of an audio signal outputted through the audio output module 309. The signal (e.g., the external audio signal) received by the audio input module 311 may include a target signal (e.g., a user input voice signal). The external audio signal may include an echo signal along with the target signal. For example, the echo signal may include an audio signal outputted through the audio output module 309. The echo signal may include a non-linear component (i.e., a non-linear signal) resulting from a non-linearity of a speaker in response to the electronic device 101 outputting the audio signal through the audio output module 309 (e.g., the speaker), and/or a non-linear component resulting from a non-linearity of a microphone in response to the outputted audio signal being again introduced into the audio input module 311 (e.g., the microphone). The echo signal may include even a linear component.

In various embodiments, the processor 120 may receive an audio signal from the audio output module 309. In some embodiments, the audio signal may be transmitted from the audio output module 309 to the non-linear filter 303. In response to the processor 120 including a plurality of non-linear filters, the audio signal may be transmitted from the audio output module 309 to each of the plurality of non-linear filters.

In various embodiments, the processor 120 may process the received audio signal, based on the non-linear filter 303, the linear filter 305, and/or the audio filter 307. The non-linear filter 303 may be a filter having an attribute of non-linearity. The linear filter 305 may be a filter having an attribute of linearity. The audio filter (or neural network) 307 may be a filter capable of performing a neural network operation, based on a neural network.

In various embodiments, by using the non-linear filter 303, the processor 120 may non-linear model (or filter) the audio signal received from the audio output module 309. The processor 120 may non-linear model the audio signal, based on the attribute of non-linearity of the non-linear filter 303. To reflect an attribute of a non-linear signal included in the audio signal, the processor 120 may non-linear model the audio signal, based on the non-linear filter 303. The non-linear modeled audio signal may include the attribute of the non-linear signal included in the audio signal.

In various embodiments, the non-linear filter 303 may be a functional construction (i.e., set or group) including at least one non-linear filter. In some embodiments, the at least one non-linear filter may be a filter for reflecting an attribute of non-linearity (i.e., related with the attribute of non-linearity).

The at least one non-linear filter included in the non-linear filter 303 may be related with a mutually different attribute of non-linearity. For example, the non-linear filter 303 may include a first filter and a second filter. The first filter may be a filter for a first attribute. The second filter may be a filter for a second attribute.

In various embodiments, the processor 120 may linear model the non-linear modeled audio signal, into a second audio signal through the linear filter 305. The processor 120 may linear model the audio signal into the second audio signal, based on the attribute of linearity of the linear filter 305. To reflect an attribute of the linear signal included in the audio signal, the processor 120 may linear model the audio signal into the second audio signal, based on the linear filter 305.

In various embodiments, in response to an external audio signal (e.g., a target signal and an echo signal) being received through the audio input module 311, the processor 120 may process to remove the echo signal from the external audio signal, based on the above-described modeled audio signals, wherein only the target signal is included in the external audio signal. The processor 120 may perform signal processing for removing an echo signal corresponding to the second audio signal from the external audio signal. The second audio signal may be a signal which is modeled in order to reflect an attribute of non-linearity of the external audio signal and an attribute of linearity thereof in the audio signal. The second audio signal may include an attribute of non-linearity among an echo component, based on the non-linear filter 303. The second audio signal may include an attribute of linearity among the echo component, based on the linear filter 305.

In various embodiments, the processor 120 may neural network model the audio signal non-linear modeled by the non-linear filter 303, into a third audio signal through the audio filter 307. In some embodiments, the audio filter 307 may include nodes (or artificial nodes) which are known as "neurons", "processing elements", "units", or the term similar with or corresponding to this. The nodes may be connected with one another to form a network mimicking a biological neural network. The audio filter (or neural network) 307 may be software for implementing an algorithm useful for machine learning, based on the network. In accordance with embodiments, the neural network operation may be denoted as deep-learning, machine learning, etc. In various embodiments, the processor 120 may refine the audio filter 307, based on input and output of the audio filter 307. Through the refining of the audio filter 307, the processor 120 may real-time reflect a non-linear attribute (i.e., non-linearity) of the audio signal in the third audio signal. In various embodiments, the term 'filter' may be denoted as a filtering unit, a filter unit, a modeling unit, an operation unit or the like, and is not limited to this. For example, the non-linear filter 303 may be denoted as a non-linear filter unit, and the linear filter 305 may be denoted as a linear layer, and the audio filter 307 may be denoted as a neural network.

In various embodiments, the processor 120 may process the external audio signal in order to remove an echo signal corresponding to the third audio signal from the external audio signal. The third audio signal may be a signal in which an attribute of non-linearity is reflected through the non-linear filter 303 and the audio filter 307.

In various embodiments, the processor 120 may remove the echo signal corresponding to the third audio signal from the external audio signal from which the echo signal corresponding to the second audio signal has been removed. The processor 120 may transmit the external audio signal for which the removing of the second audio signal and the third audio signal has been completed, to another constituent element within the electronic device 101.

Though not illustrated, in various embodiments, the non-linear filter 303, the linear filter 305 and/or the audio filter 307 may be included in another constituent element within the electronic device 101. For example, the non-linear filter 303, the linear filter 305 and/or the audio filter 307 may be included in the audio module 170 of FIG. 2. For example, the non-linear filter 303, the linear filter 305 and/or the audio filter 307 may be included as a part of the audio signal processor 240 of FIG. 2. In some embodiments, the non-linear filter 303, the linear filter 305 and/or the audio filter 307 may be configured independently of the processor 120.

In various embodiments, the electronic device 101 may include the audio output module 309, the audio input module 311, and the processor 120. The processor 120 may identify a first audio signal that will be outputted through the audio output module 309, and provide a first signal into which the first audio signal is processed by using a first filter having a first attribute of non-linearity and a second signal into which the first audio signal is processed by using a second filter having a second attribute of non-linearity. The processor 120 may output the first audio signal through the audio output module 309, and acquire an external audio signal including the first audio signal of the electronic device 101 through the audio input module 311. The processor 120 may acquire a first output value through a first input channel of the audio filter 307 in which a first weight having a first non-linear characteristic is applied to a magnitude value corresponding to a first frequency among the first signal and a magnitude value corresponding to the first frequency among the second signal. The processor 120 may acquire a second output value through a second input channel of the audio filter 307 in which a second weight, distinct from the first weight, having a second non-linear characteristic is applied to a magnitude value corresponding to a second frequency among the first signal and a magnitude value corresponding to the second frequency among the second signal. The processor 120 may be configured to provide the second audio signal, based on a first difference value between the magnitude value corresponding to the first frequency of the external audio signal and the first output value, and a second difference value between the magnitude value corresponding to the second frequency of the external audio signal and the second output value.

In various embodiments, the electronic device 101 may include the audio output module 309, the audio input module 311, the memory 130 storing instructions, and at least one processor (for example, the processor 120). The at least one processor 120 may be configured to execute the stored instructions, in order to output the first audio signal through the audio output module 309, and model the first audio signal through the non-linear filter 303, based on an attribute of non-linearity, and model the first audio signal, which is modeled based on the attribute of non-linearity, into the second audio signal through the linear filter 305, based on the attribute of linearity, and model the first audio signal, which is modeled based on the attribute of non-linearity, into the third audio signal through the neural network 307, and, in response to receiving the external audio signal related with the first audio signal through the audio input module 311, process the received external audio signal, based on the second audio signal and the third audio signal.

Figure 4:
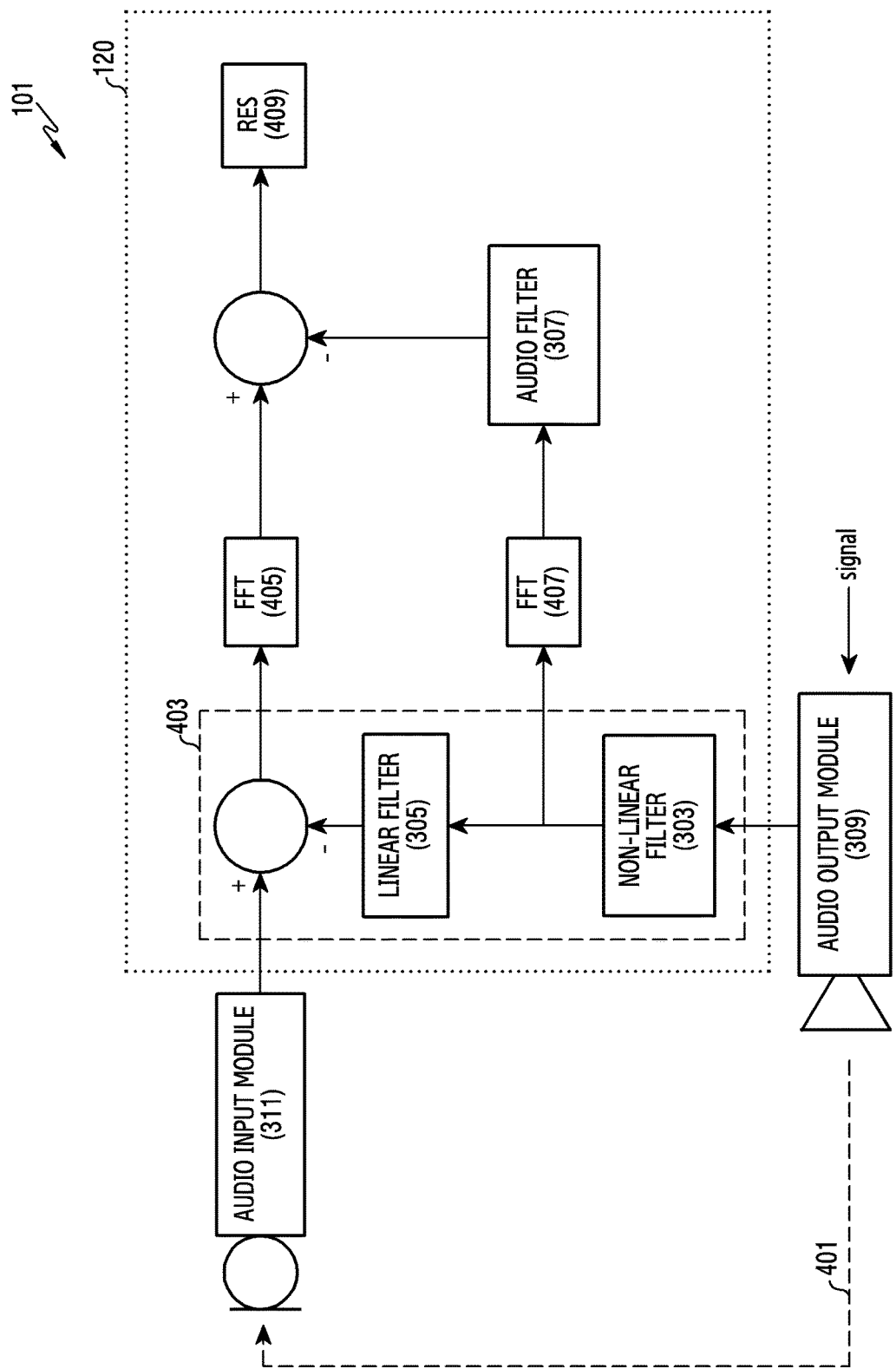
FIG. 4 illustrates an example of a construction of an electronic device for processing an external audio signal according to various embodiments.

FIG. 4 illustrates an example of a construction of an electronic device for processing an external audio signal according to various embodiments.

Referring to FIG. 4, the electronic device 101 may include the audio output module 309, the audio input module 311, and/or the processor 120. The processor 120 may include the non-linear filter 303, the linear filter 305, the audio filter 307, fast Fourier transform (FFT) units 405 and 407, and/or a residual echo suppression (RES) 409.

Referring to FIG. 4, the audio output module 309 may receive a signal. The signal may include a signal provided based on a system of the electronic device 101, or include a signal received from an external device. The audio output module 309 may output the received signal. The audio output module 309 may output the received signal through a speaker, a sound output device 155, or the like. In various embodiments, the received signal (hereinafter, an audio signal) may include a signal received from another electronic device through the communication module 190 included within the electronic device 101. In some embodiments, the audio signal may include a signal received from the another electronic device in a wireless or wired communication environment. For example, in response to a user of the electronic device 101 wirelessly and/or wiredly communicating (or calling) with a user of the another electronic device, the audio signal may be a signal (e.g., a voice signal) related with a sound received from the another electronic device. In other some embodiments, the audio signal may include a signal provided within the electronic device 101, based on the execution of at least one application included within the electronic device 101. For example, the electronic device 101 may reproduce a music file through a music application. The audio signal may be a sound signal provided within the electronic device 101, based on the music file. Or, the audio signal may be a signal related with the reproduction received through the network 199, based on reproduction of the music file. In further other some embodiments, the audio signal may include a signal received from the server 108 through the network 199. In accordance with an embodiment, the audio signal may include a signal related with a sound for outputting through the audio output module 309, and may be denoted as various terms such as audio data, a sound signal, sound data, a signal, or the like.

In various embodiments, the electronic device 101 may receive an echo signal and/or a target signal through the audio input module 311. For example, in response to the electronic device 101 being in a voice call mode, the target signal may be a signal on a voice of a user of the electronic device 101. The echo signal may be a signal that the outputted signal is introduced into the audio input module 311 along a path 401, in response to the electronic device 101 outputting the signal received through the communication module 190 by using the audio output module 309. To transmit the received target signal to the another electronic device, the electronic device 101 may perform signal processing. The signal processing may include processing for removing the echo signal from the input signal, to obtain and transmit only the target signal, in response to the target signal and the echo signal being inputted (e.g., input signal) together through the audio input module 311.

In various embodiments, the echo signal may include the outputted audio signal. The audio input module 311 may receive the outputted audio signal through the microphone. The echo signal received through the audio input module 311 may include a non-linear signal. In response to the received echo signal being an analog signal, the audio input module 311 may convert the analog signal into a digital signal through an analog to digital converter (ADC). The converted digital signal may be indicated in the form of a voice waveform.

In various embodiments, referring to the path 401, the electronic device 101 may receive, through the audio input module 311, an audio signal outputted through the audio output module 309. In some embodiments, the external audio signal may include a linear signal and/or a non-linear signal. The linear signal may be a signal capable of being indicated in a linear waveform, that is, a signal capable of being indicated in a differentiable form. The non-linear signal may be a signal provided (or introduced) while the audio signal is outputted through the audio output module 309, or provided while the external audio signal is introduced through the audio input module 311. The non-linear signal may be a signal having an attribute of non-linearity. The non-linear signal may be a signal not capable of being indicated in a linear form, that is, a signal not capable of being indicated in a differentiable form. The non-linear signal may be provided by a non-linearity of an element included within the electronic device 101, or may be provided by a vibration of the electronic device 101 or the element included within the electronic device 101.

Referring to FIG. 4, the processor 120 may include an acoustic echo cancellation (AEC) 403. In various embodiments, the external audio signal may be converted into a digital signal and be transmitted to the processor 120. The processor 120 may perform processing for removing an audio signal being an echo signal from the external audio signal.

In various embodiments, the AEC 403 may include the linear filter 305 and the non-linear filter 303. The AEC 403 may be a functional construction for processing a reverberation (or echo). The AEC 403 may model (or filter) a received audio signal through the non-linear filter 303. In other some embodiments, the AEC 403 may receive an external audio signal from the audio input module 311. The AEC 403 may process the external audio signal, based on a signal processed through the non-linear filter 303 and the linear filter 305. For example, the AEC 403 may remove the signal processed through the non-linear filter 303 and the linear filter 305, from the external audio signal.

In various embodiments, the AEC 403 may include the linear filter 305. The AEC 403 may receive an audio signal from the audio output module 309, and model this, based on an attribute of linearity. The AEC 403 may receive an external audio signal from the audio input module 311. To remove the audio signal modeled based on the attribute of linearity from the external audio signal, the AEC 403 may process the external audio signal. For example, the AEC 403 may remove a signal processed by the linear filter 305, from the external audio signal. In some embodiments, the processor 120 may perform processing for removing a signal provided based on the non-linear filter 303 and the audio filter 307, from the signal processed through the AEC 403.

In various embodiments, the AEC 403 may refine the linear filter 305 and the non-linear filter 303, based on a signal inputted through the path 401 and/or a signal outputted through the path 401. The AEC 403 may non-linear model a received audio signal through the non-linear filter 303. The AEC 403 may linear model the non-linear modeled audio signal through the linear filter 305. The linear modeled audio signal may be denoted as a second audio signal. In some embodiments, the AEC 403 may receive an external audio signal from the audio input module 311. To remove the second audio signal from the received external audio signal, the AEC 403 may process the external audio signal.

Referring to FIG. 4, the audio output module 309 may transmit an audio signal to the non-linear filter 303. The non-linear filter 303 may model the received audio signal. In various embodiments, the non-linear filter 303 may model the received audio signal, based on an attribute of non-linearity. The non-linear filter 303 may include a filter related with the sigmoid function.

In various embodiments, the processor 120 may previously identify the sigmoid function related with the non-linear filter 303, based on a signal outputted through the audio output module 309 and a signal that the outputted signal is inputted through the audio input module 311 along the path 401. The sigmoid function may include an attribute of non-linearity. In some embodiments, the processor 120 may real-time estimate and refine a parameter of the sigmoid function, based on the outputted and inputted signals. The processor 120 may real-time refine the parameter of the sigmoid function, based on various algorithms.

In various embodiments, the attribute of non-linearity related with the external audio signal may be indicated variously according to a frequency band, a gain of an outputted signal, and/or a mounting state of an element (e.g., a microphone, a speaker, etc.) included in the electronic device 101. In various embodiments, the electronic device 101 may model various, variable attributes of non-linearity, based on a plurality of sigmoid functions.

In various embodiments, the processor 120 may transmit a signal modeled through the non-linear filter 303, to the linear filter 305 and the audio filter 307. In some embodiments, the non-linear filter 303 may model the received audio signal, based on the attribute of non-linearity. The non-linear filter 303 may transmit the modeled audio signal (hereinafter, the non-linear modeled signal) to the linear filter 305 and the audio filter 307.

In various embodiments, the non-linear filter 303 may include a plurality of non-linear filters. The plurality of non-linear filters may each include a mutually different attribute of non-linearity. For example, the non-linear filter 303 may include a first filter and a second filter. The first filter may include a first attribute of non-linearity. The second filter may include a second attribute of non-linearity distinct from the first attribute.

In various embodiments, the non-linear filter 303 may be a filter related with a sigmoid function, and may indicate diverse attributes of non-linearity through the sigmoid function. For example, the plurality of sigmoid functions having mutually different parameters (or coefficients) may each have a mutually different attribute of non-linearity. The sigmoid function may be displayed as a curve of an S form on a graph. A detailed description related with this will be made later through FIG. 14.

In various embodiments, the non-linear filter 303 may model a signal, based on the sigmoid function. The non-linear filter 303 may reflect an attribute (i.e., feature or characteristic) of non-linearity in a signal inputted based on the sigmoid function. The inputted signal may be non-linear modeled based on the non-linear filter 303. In some embodiments, the non-linear filter 303 may include a plurality of non-linear filters. The plurality of non-linear filters may each include a mutually different attribute of non-linearity. In response to the non-linear filter 303 receiving the audio signal, the non-linear filter 303 may input the received audio signal to each of the plurality of non-linear filters. The non-linear filter 303 may reflect a mutually different attribute of non-linearity in the received audio signal through the plurality of non-linear filters. In various embodiments, the non-linear filter 303 may model an audio signal received from the audio output module 309 and then, transmit the modeled audio signal to the linear filter 305 and the audio filter 307. In some embodiments, in response to the non-linear filter 303 including the plurality of non-linear filters, the non-linear filter 303 may transmit the first signal in which the first attribute is reflected and the second signal in which the second attribute is reflected, to the linear filter 305. The non-linear filter 303 may transmit, to the audio filter 307, the first signal in which the first attribute is reflected and the second signal in which the second attribute is reflected.

In various embodiments, the linear filter 305 may receive a signal in which an attribute of non-linearity is reflected. The linear filter 305 may model the received signal, based on an attribute of linearity. The received signal may include an attribute of linearity through the linear filter 305. In some embodiments, the linear filter 305 may be an adaptive filter having an attribute of linearity. The adaptive filter may be adaptively refined, based on an input value and an output value. The adaptive filter may adaptively model the received signal, based on the refining.

In various embodiments, the linear filter 305 may receive the audio signal from the audio output module 309, to model the audio signal. The linear filter 305 may include an attribute of linearity, and may perform modeling related with a linear signal included in the external audio signal. The linear filter 305 may reflect the attribute of linearity in the received audio signal, to perform the modeling.

In various embodiments, the linear filter 305 may receive a signal modeled by a plurality of sigmoid functions. On a time axis, a modeling process (e.g., normalized least mean square (NLMS) filtering) for the linear filter 305 may correspond to a signal processing process of an adaptive filter. In some embodiments, in response to signals received to the linear filter 305 being an N number, a length of the linear filter 305 may be lengthened by N times, compared with modeling for one signal. In proportion to the number of signals received to the linear filter 305 and/or the length of the linear filter 305, the number of operations of the electronic device 101 may increase. In various embodiments, in response to the number of operations of the electronic device 101 and a memory thereof being limited, the linear filter 305 may selectively use at least a part of the received signals. For example, in response to the linear filter 305 receiving an N number of signals, the linear filter 305 may selectively use a signal for one sigmoid function exhibiting the best performance.

In various embodiments, the signals for the plurality of sigmoid functions may be used to remove an echo on a frequency axis. The number of operations of the electronic device 101 related with the number of inputted signals on the frequency axis may be less than the number of operations of the electronic device 101 related with the number of inputted signals on a time axis. The processor 120 may decrease the number of operations by performing the operation related with the signal for a multiplying operation of the frequency axis. In some embodiments, the processor 120 may decrease the number of operations by using an algorithm related with fast Fourier transform (FFT).

In various embodiments, the FFT units 405 and 407 may include a construction for performing the FFT and/or Fourier transform. The FFT and/or the Fourier transform may be a method for transforming a time axis (or domain) signal into a frequency axis, to analyze the signal.

In various embodiments, the FFT unit 407 may transform the non-linear modeled signal from a time axis to a frequency axis. The FFT unit 405 may transform the external audio signal from which the second audio signal is removed, from the time axis to the frequency axis.

In various embodiments, the signal transformed based on the FFT may be distinguished based on an N number (arbitrary number) of frequencies. For example, the first signal may be decomposed into a first signal on a first frequency and a first signal on a second frequency, through the FFT. In some embodiments, the FFT transformed frequency axis signal may be divided into an N number of ranges, and each range may be a first frequency to an Nth frequency.

In various embodiments, the processor 120 may use outputs of two or more non-linear filters (sigmoid functions) as inputs of the audio filter 307 (e.g., non-linear echo magnitude regression). The processor 120 may perform FFT as much as the non-linear filters. The FFT may be implemented by the less number of operations, compared to an operation (e.g., NLMS operation) related with the linear filter 305.

In various embodiments, the audio filter 307 may include a neural network, or a filter in which a neural network operation is possible. The audio filter 307 may neural network model a signal received based on a frequency axis. For example, the audio filter 307 may perform neural network modeling for a signal transformed into the frequency axis by the FFT unit 407.

In various embodiments, the audio filter 307 may include an attribute of non-linearity. The audio filter 307 may neural network model the received signal, based on the attribute of non-linearity. The signal neural network modeled through the audio filter 307 may be denoted as a third audio signal.

In various embodiments, the audio filter 307 may be real-time refined based on an input value and an output value. The audio filter 307 may include previously identified training data. The training data may be identified based on the input value and output value of the audio filter 307. The audio filter 307 may identify an error of the output value, based on information about the training data. The audio filter 307 may be real-time refined, based on the error. The audio filter 307 may be refined through a method of forwarding the error from an output layer to an input layer. In some embodiments, the audio filter 307 may include a weight. The weight may be refined based on the identified error. The audio filter 307 may be real-time refined, based on the weight being refined.

In various embodiments, to remove a signal corresponding to the third audio signal, the processor 120 may transform a signal (hereinafter, a primarily processed signal) for which processing for the second audio signal has been completed, from a time axis to a frequency axis, through the FFT unit 405. The processor 120 may distinguish the primarily processed signal transformed into a frequency axis signal, on a per-frequency basis. For example, the processor 120 may divide the primarily processed signal into an N number of signals for an N number of frequencies. The processor 120 may perform processing for removing an echo signal corresponding to the third audio signal from the primarily processed signal divided by N number of frequencies. For another example, the processor 120 may identify the primarily processed signal as a primarily processed signal for a first frequency and a primarily processed signal for a second frequency. The third audio signal may include an output value for the first frequency and an output value for the second frequency. The processor 120 may remove a signal corresponding to the output value for the first frequency included in the third audio signal, from the primarily processed signal for the first frequency. The processor 120 may remove a signal corresponding to the output value for the second frequency included in the third audio signal, from the primarily processed signal for the second frequency.

In various embodiments, the processor 120 may transmit a signal for which the processing for removing the third audio signal has been completed, to the residual echo suppression (RES) 409 for removing a residual echo signal. Though not illustrated, the processor 120 may transmit the signal for which the processing for removing the third audio signal has been completed, to a noise suppression (NS) for removing a noise. In response to an echo signal remaining in the external audio signal, the processor 120 may remove a residual external audio signal through the RES and/or NS.

In various embodiments, though not illustrated, the acoustic echo cancellation (AEC) may include a linear filter 305 part for removing a linear signal and a part (e.g., the non-linear filter 303 and the audio filter 307) for removing a non-linear signal on a frequency axis. After AEC processing, a finally remaining residual echo signal may be forwarded from the AEC to the NS and/or RES and thus, be removed.

In various embodiments, the RES 409 and the NS may be included within the processor 120 or exist separately. In some embodiments, the RES 409 and the NS may be included in another constituent element of the electronic device 101. For example, the RES 409 and the NS may be included in the audio module 170 of FIG. 2. For example, the RES 409 and the NS may be included as a part of the audio signal processor 240 of FIG. 2.

Operations carried out by the linear filter 305, the non-linear filter 303, the FFT units 405 and 407, the audio filter 307, and the AEC 403 described through FIG. 4 may be performed by the processor 120. In some embodiments, the operations may be carried out by the processor 120 configured to execute the instructions stored in the memory 130.

Figure 5:
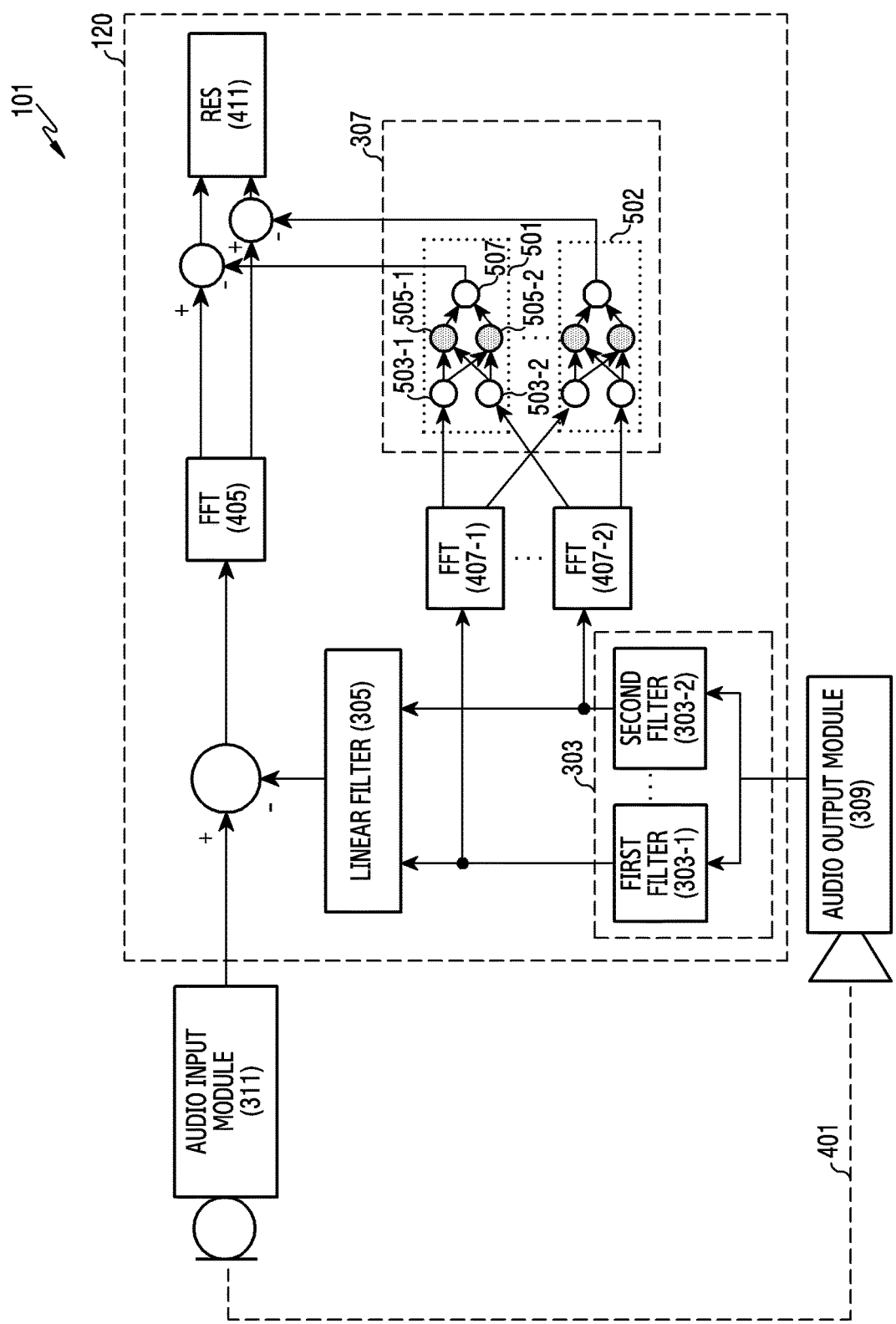
FIG. 5 illustrates another example of a construction of an electronic device for processing an external audio signal according to various embodiments.

FIG. 5 illustrates another example of a construction of an electronic device for processing an external audio signal according to various embodiments.

Referring to FIG. 5, the processor 120 includes the non-linear filter 303 including a first filter 303-1 and a second filter 303-2, the linear filter 305, the FFT units 405, 407-1 and 407-2, the audio filter 307, and the RES 411. In relation with FIG. 4, FIG. 5 may include duplicated constructions (for example, the audio output module 309, the audio input module 311, and/or the RES 411). A description related with the duplicated construction may refer to FIG. 4.

In various embodiments, the non-linear filter 303 may include a plurality of non-linear filters having an attribute of non-linearity. The audio output module 309 may transmit an audio signal to each of the plurality of non-linear filters. In some embodiments, the audio output module 309 may transmit the audio signal to the non-linear filter 303. The non-linear filter 303 may transmit the audio signal to each of the plurality of non-linear filters. In other some embodiments, the non-linear filter 303 may model the received audio signal by using at least two filters that will model the audio signal among the plurality of filters. In an embodiment, the at least two filters may be previously identified by the processor 120.

Referring to FIG. 5, in various embodiments, the non-linear filter 303 may include the first filter 303-1 having a first attribute of non-linearity and the second filter 303-2 having a second attribute of non-linearity. The first attribute and the second attribute may be divided by a parameter on the non-linear filter 303. For example, a coefficient (or parameter) of the sigmoid function for the first attribute and a coefficient (or parameter) of the sigmoid function for the second attribute may be different mutually.

In various embodiments, the audio signal may reflect an attribute of non-linearity of an element (e.g., a speaker, a microphone or the like) through the sigmoid function. The parameter of the sigmoid function may be previously identified, based on a signal related with the element. In some embodiments, the parameter of the sigmoid function may be real-time estimated through the processor 101.

In various embodiments, the non-linear filter 303 may model an audio signal received by the first filter, into a first signal, based on the first attribute. The non-linear filter 303 may model an audio signal received by the second filter, into a second signal, based on the second attribute.

In various embodiments, the linear filter 305 may receive a plurality of signals from the non-linear filter 303. For example, the linear filter 305 may receive the first signal and the second signal from the non-linear filter 303. The signal modeled through the non-linear filter 303 may be used as an echo reference signal of the linear filter 305. In some embodiments, the linear filter 305 may correspond to an adaptive filter applying at least one algorithm among normalized least mean square (NLMS), affine projection (AP), and/or recursive least square (RLS). The linear filter 305 may model the plurality of signals into signals reflecting an attribute of linearity in the received plurality of signals. For example, the linear filter 305 may model the first signal and the second signal, based on the attribute of linearity of the linear filter 305. In various embodiments, the processor 120 may transmit at least some of the plurality of signals modeled through the non-linear filter 303, to the linear filter 305. In various embodiments, the linear filter 305 may perform modeling (e.g., NLMS modeling, etc.) for the linear filter 305 on a time axis, with inputs being signals modeled by a plurality of sigmoid functions. The NLMS modeling may correspond to signal processing of a general adaptive filter. In some embodiments, in response to a signal received to the linear filter 305 being an N number, a length of the linear filter 305 may be lengthened by N times, compared with modeling for one signal. In proportion to the number of signals received to the linear filter 305 and/or the length of the linear filter 305, the number of operations of the electronic device 101 may increase. In various embodiments, in response to the number of operations of the electronic device 101 and a memory thereof being limited, the linear filter 305 may selectively use at least a part of the received signal. For example, in response to the linear filter 305 receiving an N number of signals, the linear filter 305 may selectively use a signal for one sigmoid function exhibiting the best performance. The linear filter 305 may model the selected signal, based on an attribute of linearity.

In various embodiments, the processor 120 may transform the first signal modeled through the first filter 303-1, from the time axis to the frequency axis, based on the FFT unit 407-1. The processor 120 may transform the second signal modeled through the second filter 303-2, from the time axis to the frequency axis, based on the FFT unit 407-2. In various embodiments, the attribute of non-linearity related with the external audio signal may be indicated variously according to a frequency band, a gain of an outputted signal, and/or a mounting state of an element (e.g., a microphone, a speaker, etc.) included in the electronic device 101. In various embodiments, the electronic device 101 may model various, variable attributes of non-linearity, based on a plurality of sigmoid functions.

In various embodiments, the processor 120 may distinguish, by a frequency, the first signal transformed based on the FFT unit 407-1 and the second signal transformed based on the FFT unit 407-2. For example, the first signal and the second signal may be each distinguished into a value for the first frequency and a value for the second frequency. The processor 120 may the distinguished first signal (i.e., the value for the first frequency of the first signal and the value for the second frequency of the first signal) and the distinguished second signal (i.e., the value for the first frequency of the second signal and the value for the second frequency of the second signal), to the audio filter 307.

In various embodiments, the audio filter 307 may include a plurality of audio filters. The number of the plurality of audio filters may correspond to the number (N) of the divided frequencies. For example, in response to the number of the divided frequencies being an N number, the audio filter 307 may include an N number of audio filters. In some embodiments, the audio filter 307 may include a first audio filter for a first frequency and a second audio filter for a second frequency. The processor 120 may transmit the value for the first frequency of the first signal and the value for the first frequency of the second signal, to the first audio filter related with the first frequency. The processor 120 may transmit the value for the second frequency of the first signal and the value for the second frequency of the second signal, to the second audio filter related with the second frequency. In accordance with embodiments, the divided frequency may be denoted as a frequency bin. For example, the first frequency may be denoted as a first frequency bin.

Referring to FIG. 5, in various embodiments, the audio filter 307 may include a plurality of nodes at which input and/or output are performed, and the plurality of nodes may be connected based on a hierarchy. The hierarchy may be comprised of an input layer, a hidden layer, and an output layer. The input layer and the output layer may be connected with each other with interposing the hidden layer therebetween. The respective hierarchies may include one or more nodes.

In various embodiments, the audio filter 307 may include an input layer (i.e., a node unit, a node layer, a filter unit or a filter layer), a hidden layer (i.e., a node unit, a node layer, a filter unit or a filter layer), and/or an output layer (i.e., a node unit, a node layer, a filter unit or a filter layer). The input layer, the hidden layer, and the output layer may be connected sequentially. In some embodiments, the input layer may include a plurality of input nodes. The hidden layer may include at least one hidden node. The output layer may include at least one output node. The plurality of input nodes may be connected with the at least one hidden node. The at least one hidden node may be connected with the at least one output node. The non-linear modeled audio signal may be transmitted to each of the plurality of input nodes. The non-linear modeled audio signals transmitted to the respective input nodes may be modeled based on connection between the input layer, the hidden layer, and/or the output layer which are included in the audio filter 307.

In various embodiments, the audio filter 307 may include weights (or parameters). The weights may be adjusted based on an algorithm of the audio filter 307. The weights may be values identified based on a non-linear function (for example, a sigmoid function, a rectified linear unit (ReLU) function, etc.) (Herein, the non-linear function may be a function distinct from a non-linear function applied to a non-linear filter). The audio filter 307 may reflect an attribute of non-linearity in an inputted value, based on the weights. For example, the audio filter 307 may approximate the non-linear functions to the input value. In some embodiments, the weight may be related with a strength of connection between the nodes included in the neural network.

In various embodiments, the weights of the audio filter 307 may be refined. The audio filter 307 may be real-time refined based on the weights being refined. In an embodiment, the audio filter 307 may include a plurality of filters. In response to the audio filter 307 including a plurality of weights for the respective plurality of filters, the refined weight may be refined based on the plurality of weights being refined. The weight may be a functional expression for indicating the plurality of weights.

In various embodiments, the audio filter 307 may be refined based on a value inputted to the audio filter 307 and a value outputted based on the audio filter 307. The audio filter 307 may be refined based on backpropagation (or an error backpropagation method).

In various embodiments, the output layer may be connected with the hidden layer, based on a weight (or connection weight). The weight may be refined, based on an error transmitted from the output layer to the hidden layer. The audio filter 307 may transmit the error transmitted to the hidden layer, to the input layer via the hidden layer. The input layer may be connected with the hidden layer, based on another weight. The another weight may be refined, based on the error transmitted to the input layer via the hidden layer. The audio filter 307 may be refined in real-time and/or continuously, based on the refined error.

In accordance with an embodiment, the processor 120 may previously identify training data, based on the inputted value and the outputted value. By comparing an actually outputted output value and the training data, based on the identified training data, the processor 120 may identify an error. The processor 120 may refine the weight, based on the error. In another embodiment, the processor 120 may transmit the error from the output layer to the input layer. For example, the processor 120 may compare the previously identified training data value and the identified output value, correspondingly to identifying the output value. The processor 120 may identify an error of the processor 120, based on the comparison. The processor 120 may transmit the error from the output layer to the hidden layer. The processor 120 may refine the audio filter 307, based on the transmitting.

In various embodiments, a first audio filter 501 may receive values for a first frequency. The first audio filter 501 may include a plurality of input nodes (or filters) 503-1 and 503-2. Through the plurality of input nodes (503-1 and 503-2), the first audio filter 501 may receive a plurality of signals. The first signal and the second signal may be transmitted to an output node (or filter) 507 through a plurality of hidden nodes (or filters) 505-1 and 505-2. Through the output node 507, the audio filter 307 may identify a first output value. The first audio filter 501 may receive a plurality of signals. Even the second audio filter 502 may include the same construction as the first audio filter 501. A description related with this will be made later through FIG. 8A and FIG. 8B.

In various embodiments, the first audio filter 501 may include an attribute of non-linearity. The first audio filter 501 may model a value for a first frequency of the received first signal and a value for a first frequency of the second signal, based on the attribute of the first audio filter 501. The first audio filter 501 may identify a first output value through the modeling. A construction and/or operation of the second audio filter 502 may correspond to those of the first audio filter 501.

In various embodiments, the processor 120 may identify the signal modeled through the linear filter 305, as a second audio signal. The processor 120 may process the external audio signal received through the audio input module 311, based on the second audio signal. The processor 120 may remove an echo signal corresponding to the second audio signal, from the received external audio signal.

In various embodiments, the processor 120 may transform the processed external audio signal from the time axis to the frequency axis. The processor 120 may decompose the processed external audio signal transformed into the frequency axis, on a per-frequency basis. In some embodiments, the processor 120 may decompose the processed external audio signal according to the number of frequencies. For example, in response to the number of frequencies being two, the processed external audio signal may be divided into signals for the two frequencies.

In various embodiments, the processor 120 may process the external audio signal by divided frequency. For example, the processor 120 may process the external audio signal corresponding to the first frequency, based on the first output value. The processor 120 may process the external audio signal corresponding to the second frequency, based on the second output value. The processed respective external audio signals may be transmitted to a RES 409.

In various embodiments, to remove a residual echo signal remaining in the external audio signal, the processor 120 may process, through the RES 409, the external audio signals processed based on the first output value and the second output value.

Figure 6:
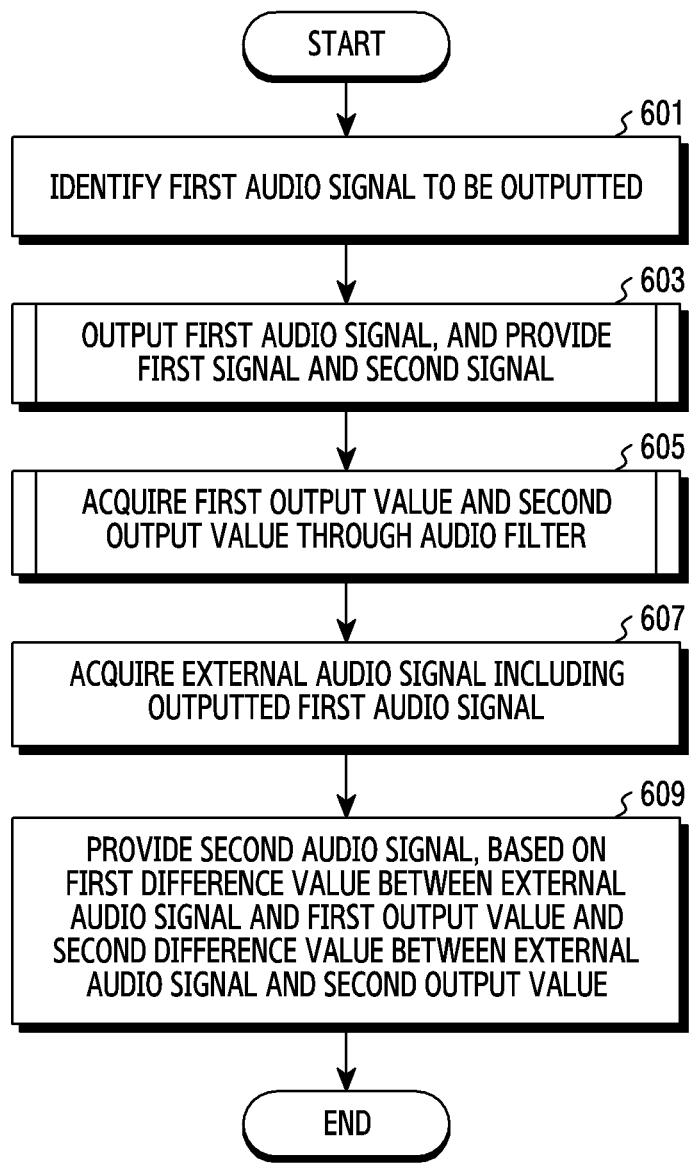
FIG. 6 illustrates an example of an operation of an electronic device for processing an external audio signal according to various embodiments.

FIG. 6 illustrates an example of an operation of an electronic device for processing an external audio signal according to various embodiments.

Referring to FIG. 6, in operation 601, the processor 120 may identify a first audio signal that will be outputted through the audio output module 309. In various embodiments, the first audio signal may include a signal transmitted from another electronic device to the electronic device 101. For example, the first audio signal may include a voice signal received from the another electronic device, at call between the electronic device 101 and the another electronic device. In some embodiments, the first audio signal may include an audio signal provided within the electronic device 101. For example, the first audio signal may include an audio signal that is provided by a music related application included within the electronic device 101.

In operation 603, the processor 120 may output the first audio signal through the audio output module 309, and provide a first signal and a second signal. For example, the processor 120 may output an audio signal received to the audio output module 309, as a sound, through a speaker, etc., and may provide the first signal that is based on the first audio signal and the second signal that is based on the first audio signal, by using a plurality of non-linear filters (e.g., the first filter 303-1 and the second filter 303-2) included within the processor 120. In various embodiments, the processor 120 may process the first audio signal, by using the first filter 303-1 including a first attribute of non-linearity and the second filter 303-2 including a second attribute of non-linearity. For example, the processor 120 may provide the first signal through the first filter 303-1, and provide the second signal through the second filter 303-2. The first filter may reflect the first attribute of non-linearity in the first audio signal, and the second filter may reflect the second attribute of non-linearity in the first audio signal.

In operation 605, the processor 120 may acquire a first output value and a second output value through the audio filter 307. In various embodiments, the processor 120 may transform the first signal and the second signal from a time axis to a frequency axis. The signal transformed into the frequency axis may be configured as a value indicating a magnitude of a signal corresponding to each frequency. For example, the first signal may include a magnitude value for the first frequency and a magnitude value for the second frequency. The second signal may include a magnitude value for the first frequency and a magnitude value for the second frequency.

In various embodiments, the processor 120 may model the magnitude value for the first frequency of the first signal and the magnitude value for the first frequency of the second signal through an audio filter (capable of corresponding to the first audio filter 501 of FIG. 5) to which a first weight is applied, to identify the first output value. The processor 120 may model the magnitude value for the second frequency of the first signal and the magnitude value for the second frequency of the second signal through an audio filter (capable of corresponding to the second audio filter 502 of FIG. 5) to which a second weight is applied, to identify the second output value. In accordance with an embodiment, the first weight and the second weight may be refined in real-time, based on a method (e.g., an error propagation method) for reflecting an error related with the audio filter. The processor 120 may secure the accuracy for the first output value and the second output value, based on the refining, and may be helpful for an adaptive environment.

In operation 607, the processor 120 may acquire an external audio signal including the outputted first audio signal through the audio input module 311. The external audio signal may further include a non-linear signal. The non-linear signal may be provided by the speaker (or the sound output device 155) while the first audio signal is outputted through the audio output module 309. The non-linear signal may be provided by the microphone while the external audio signal is acquired through the audio input module 309.

In operation 609, the processor 120 may provide a second audio signal, based on a first difference value between the external audio signal and the first output value and a second difference value between the external audio signal and the second output value. In various embodiments, the first difference value may be a difference between an echo signal corresponding to the first output value included in the external audio signal and a magnitude value corresponding to the first frequency of the external audio signal. The second difference value may be a difference between an echo signal corresponding to the second output value included in the external audio signal and a magnitude value corresponding to the second frequency of the external audio signal. In some embodiments, the processor 120 may provide the second audio signal that includes the first difference value as the magnitude value for the first frequency and includes the second difference value as the magnitude value for the second frequency. In other some embodiments, the second audio signal may be a signal that at least a part of the echo signal is removed from the external audio signal, based on a signal corresponding to the first output value and a signal corresponding to the second output value. The second audio signal may be transmitted to an NS and/or RES by the processor 120 and thus, another at least part (e.g., residual echo signal) of the echo signal existing in the second audio signal may be removed.

Figure 7:
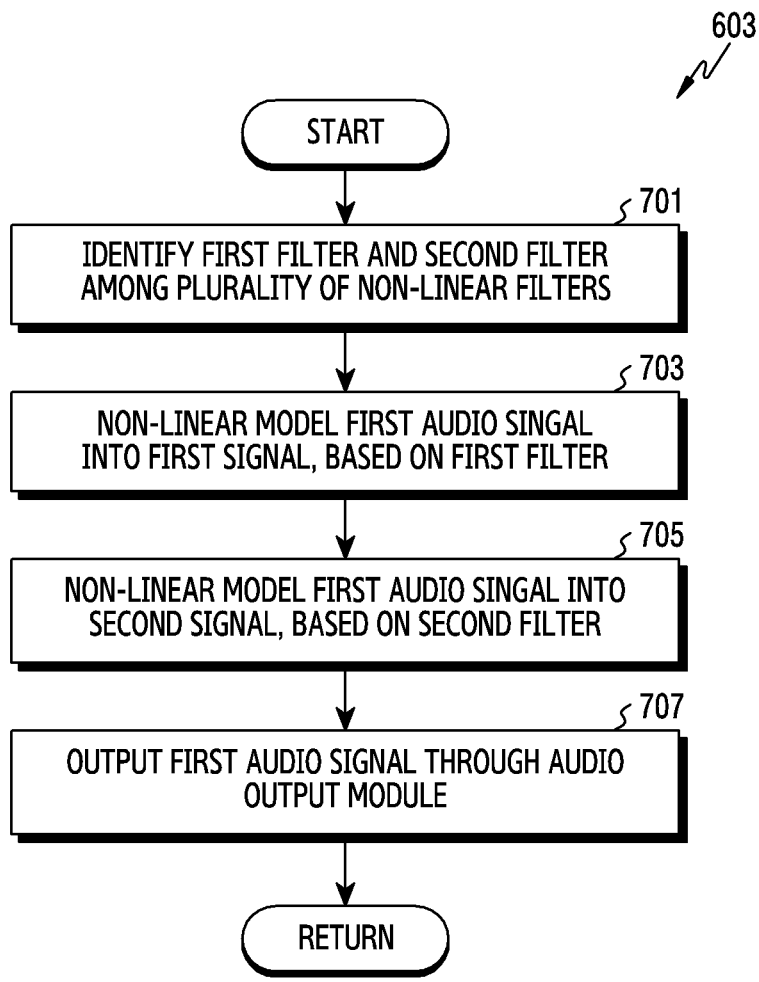
FIG. 7 illustrates an example of an operation of an electronic device for modeling an audio signal, based on a plurality of non-linear filters according to various embodiments.

FIG. 7 illustrates an example of an operation of an electronic device for modeling an audio signal, based on a plurality of non-linear filters according to various embodiments. FIG. 7 illustrates operation 603 of FIG. 6 in more detail.

In operation 701, the processor 120 may identify the first filter and/or the second filter among the plurality of non-linear filters. In various embodiments, the processor 120 may measure a non-linear signal related with the speaker and/or the microphone, to previously identify or real-time identify a non-linear function (e.g., sigmoid function). The processor 120 may identify a filter corresponding to the identified sigmoid function among the plurality of non-linear filters, as the first filter and/or the second filter. In various embodiments, the first filter may include a first attribute of non-linearity. The second filter may include a second attribute of non-linearity.

In operation 703, the processor 120 may non-linear model the first audio signal into the first signal, based on the first filter. The first signal may include the first attribute of non-linearity.

In operation 705, the processor 120 may non-linear model the first audio signal into the second signal, based on the second filter. The second signal may include the second attribute of non-linearity.

In operation 707, the processor 120 may output the first audio signal through the audio output module 309. The processor 120 may output the first audio signal through the speaker included in the audio output module 309.

Operation 701 to operation 705 are not limited to the aforementioned order (or context), and operation 701 to operation 705 may be performed in sequence or in parallel, or be performed according to another context.

Figure 8A:
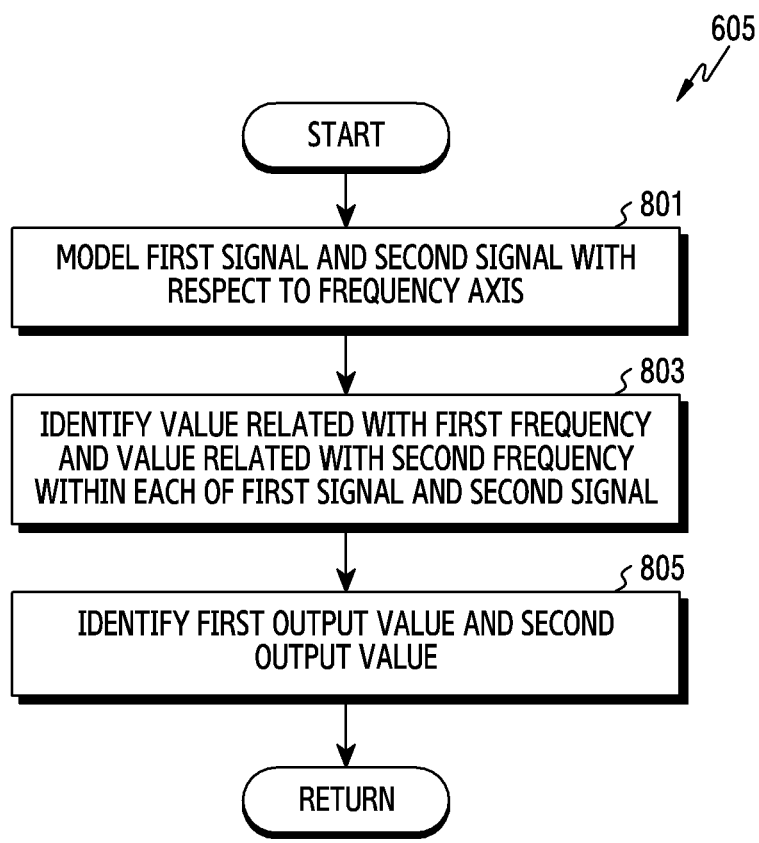
FIG. 8A illustrates an example of an operation for modeling an audio signal by using an audio filter included in an electronic device according to various embodiments.

FIG. 8A illustrates an example of an operation for modeling an audio signal by using an audio filter included in an electronic device according to various embodiments. FIG. 8A illustrates operation 605 of FIG. 6 in more detail.

In operation 801, the processor 120 may model the first signal and the second signal that are provided based on operation 603 of FIG. 6, with respect to a frequency axis. In various embodiments, the first signal and the second signal may be signals expressed on a time axis. The processor 120 may transform the first signal and the second signal from the time axis to the frequency axis. The first signal and the second signal changed into the frequency axis may have a specific value with respect to a specific frequency. For example, the first signal may include a designated value (or magnitude value) for a signal magnitude at a first frequency. The second signal may include another designated value (or magnitude value) for a signal magnitude at the first frequency.

In operation 803, the processor 120 may identify a value related with the first frequency and a value related with the second frequency within each of the first signal and the second signal. The first signal and the second signal transformed into the frequency axis may include values corresponding on a per-frequency basis. In various embodiments, the processor 120 may identify a value for the first frequency of the first signal. In various embodiments, the processor 120 may identify a value for the first frequency of the second signal. In some embodiments, the processor 120 may identify the value for the second frequency of the first signal. The processor 120 may identify the value for the second frequency of the second signal.

In operation 805, the processor 120 may identify a first output value and a second output value. In various embodiments, the processor 120 may identify the first output value through a first neural network, and may identify the second output value through a second neural network. The first neural network may be a filter for performing a neural network operation for the values related with the first frequency. The second neural network may be a filter for performing a neural network operation for the values related with the second frequency. In accordance with an embodiment, the first neural network may correspond to the first audio filter, and the second neural network may correspond to the second audio filter.

In various embodiments, the processor 120 may model the value for the first frequency of the first signal and the value for the first frequency of the second signal, based on the first neural network. The processor 120 may model the value for the second frequency of the first signal and the value for the second frequency of the second signal, based on the second neural network.

In various embodiments, the processor 120 may identify the signals related with the first frequency, as an input of the first neural network. The processor 120 may model the signals related with the first frequency through the first neural network. The processor 120 may identify the first output value, based on the modeling. In some embodiments, the processor 120 may identify the first output value, based on the attribute of non-linearity included in the first neural network.

In various embodiments, the processor 120 may identify the signals related with the second frequency, as an input of the second neural network. The processor 120 may model the signals related with the second frequency through the second neural network. The processor 120 may identify the second output value, based on the modeling. In some embodiments, the processor 120 may identify the second output value, based on the attribute of non-linearity included in the second neural network.

Figure 8B:
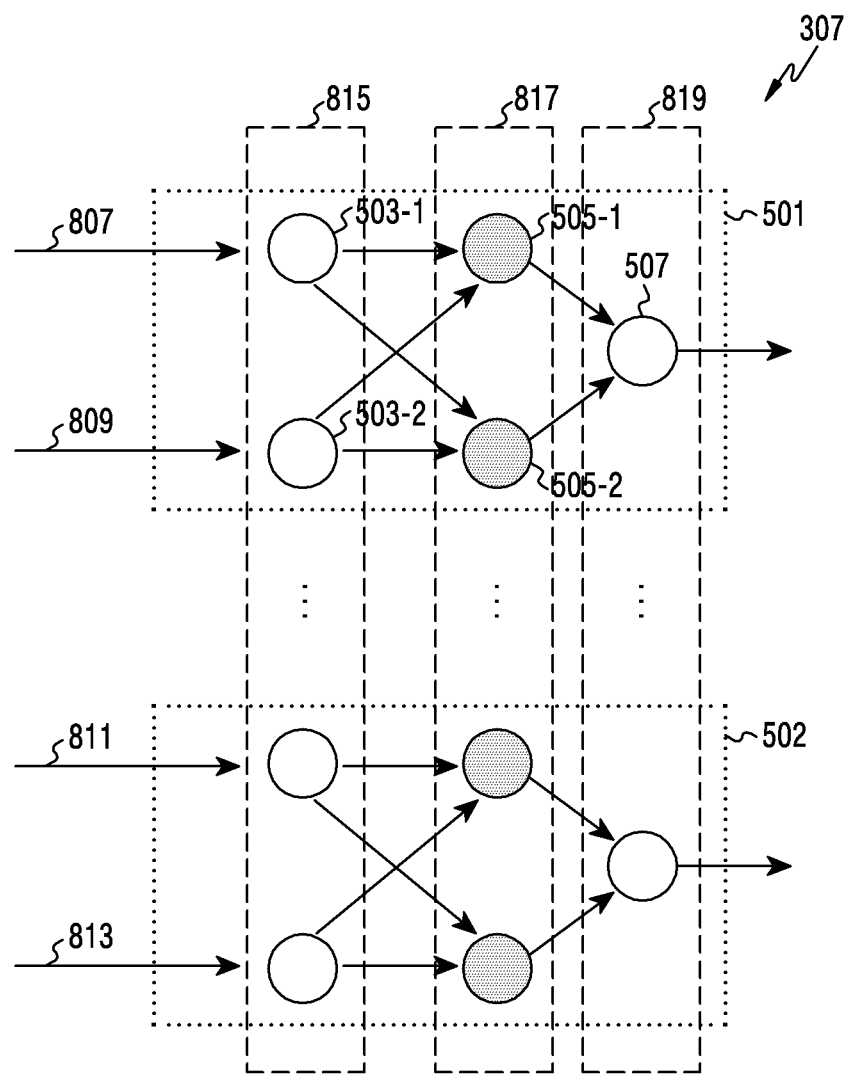
FIG. 8B illustrates an example of a construction of an audio filter included in an electronic device according to various embodiments.

FIG. 8B illustrates an example of a construction of an audio filter included in an electronic device according to various embodiments.

In various embodiments, FIG. 8B may illustrate an example of the first neural network 501 and the second neural network 502 which are included in the audio filter 307. In various embodiments, the neural network may be used for removal of a residual non-linear echo signal at a frequency axis. In accordance with an embodiment, the first neural network 501 and the second neural network 502 may be denoted as the first audio filter 501 and the second audio filter 502, respectively.

In various embodiments, the audio filter (or neural network) 307 may be software for implementing an algorithm that is useful for machine learning. The audio filter 307 may be helpful for an adaptive environment. The audio filter 307 may include nodes (or artificial nodes) known as "neurons", "processing elements", "units", or the term similar with or corresponding to this. The nodes may be connected with one another so as to form a network mimicking a biological neural network.

As illustrated in FIG. 8B, the neural network may be implemented by a plurality of nodes, and may be divided into a plurality of layers (e.g., an input layer 815, a hidden layer 817, and an output layer 819). In accordance with an embodiment, the hidden layer 817 may be included between an input node of the input layer 815 and an output node of the output layer 819, and may be comprised of one or more layers (e.g., two hidden layers).

In various embodiments, the neural network may be divided into a plurality of sub neural networks (e.g., the first neural network 501 and the second neural network 502). For example, as described above, an FFT operation is added as many as the number of output signals of non-linear filters related with a sigmoid function used for non-linear modeling, and the neural network may be distinguished as many as the number of frequency units (e.g., frequency bins) distinguished by the FFT operation. As an example, in response two non-linear filters being used, two sub neural networks (e.g., a first neural network and a second neural network) may be configured. For example, the neural network is divided as many as the number of frequency bins and a connection between nodes between frequencies is removed, thereby being capable of reducing a coefficient between the nodes. In FIG. 8B, a case of implementing two sub neural networks is described by way of example.

In various embodiments, the neural network is divided into sub neural networks, and modeling for an input value may be each performed, based on a sub neural network corresponding on a per-frequency basis. In various embodiments, it may be implemented that the hidden layer 817 is excluded or one or more layers are used in consideration of operation amount and memory aspects, etc., with respect to the hidden layer 817 between the input layer 815 and the output layer 819. For example, in response to the number of layers excluding the input layer 815 and the hidden layer 817 being zero, it may be called a shallow neural network (or a single layer neural network). In response to it being one or more, it may be called a deep neural network (or a deep layer/multi layer neural network). In various embodiments, the maintenance of modeling performance and a reduction of the number of operations may be implemented by using one hidden layer. For example, the sub neural networks may be distinguished correspondingly to a plurality of frequency bins (i.e., an N number) distinguished by the FFT operation, and the number of hidden nodes of the hidden layer is decreased to minimally decrease connections between the nodes and the number of the nodes, while maintaining non-linear modeling performance for removing a residual non-linear echo.

In various embodiments, the first neural network 501 may include a plurality of nodes 503-1, 503-2, 505-1, 505-2, and 507. The plurality of filters may be arranged forming a layer in sequence. The layer may include the input layer (or a node unit, a node layer, a filter unit or a filter layer) 815, the hidden layer 817, and the output layer 819. The input layer 815 and the output layer 819 may be connected with each other with interposing the hidden layer 817 therebetween.

In various embodiments, the layer may include one or more nodes (for example, an input node, a hidden node, and/or an output node). The input layer 815 may include a plurality of input nodes. The hidden layer 817 may include at least one hidden node. The output layer 819 may include at least one output node. Though not illustrated, the first neural network 501 may include a first weight. In some embodiments, the respective nodes included in the first neural network 501 may include respective weights. The first weight may be a functional expression for indicating an average weight applied to the first neural network 501, based on the respective weights for the respective nodes.

Referring to FIG. 8B, in various embodiments, the first neural network 501 includes the two input nodes 503-1 and 503-2, the two hidden nodes 505-1 and 505-2, and the one output node 507. The processor 120 may input a value 807 for the first frequency of the first signal, to the input node 503-1. The processor 120 may input a value 809 for the first frequency of the second signal, to the input node 503-1. The input nodes 503-1 and 503-2 may each perform an operation for a received signal, and output a signal.

In various embodiments, referring to FIG. 8B, the processor 120 may identify a signal outputted through the input node 503-1 and a signal outputted through the input node 503-2, as inputs of the hidden nodes 505-1 and 505-2. The hidden nodes 505-1 and 505-2 may each perform an operation for the received signal, and output a signal. The processor 120 may identify signals outputted through the hidden nodes 505-1 and 505-2, as inputs of the output node 507. The output node 507 may perform an operation for the inputted signals, to identify a first output value.

In various embodiments, the processor 120 may improve an error related with the first neural network 501. To improve the error, the processor 120 may refine a first weight of the first neural network 501. The first neural network 501 may be refined, correspondingly to the first weight being refined. In accordance with an embodiment, the processor 120 may previously identify training data, based on a value inputted through the input layer 815 and a value outputted through the output layer 819. The training data may be used as a criterion for identifying an error in relation with the output value of the first neural network 501. For example, the processor 120 may compare a first output value and the identified training data, based on the identified training data. The processor 120 may identify the error, based on the comparison. In some embodiments, the processor 120 may refine the first neural network 501, based on a backpropagation method. The first weight may include respective weights related with the input layer 815 and the hidden layer 817. The first weight may be refined based on the weights being refined. In an embodiment, the processor 120 may transmit the error from the output layer 819 to the hidden layer 817. The processor 120 may refine the weight related with the hidden layer 817, based on the error. The processor 120 may transmit the error from the hidden layer 817 to the input layer 815. The processor 120 may refine the weight related with the input layer 815, based on the error.

In various embodiments, the output layer 819 may be connected with the hidden layer 817, based on a weight (or a connection weight). The weight may be refined based on the error forwarded from the output layer 819 to the hidden layer 817. The audio filter 307 may forward the error forwarded to the hidden layer 817, to the input layer 815 via the hidden layer 817. The input layer 815 may be connected with hidden layer 817, based on another weight. The another weight may be refined based on an error that is forwarded to the input layer 815 via the hidden layer 817. The audio filter 307 may be refined in real-time and/or continuously, based on the refined error.

In various embodiments, the second neural network 502 may be a construction corresponding to the first neural network 501. The second neural network 502 may receive a value 811 for the second frequency of the first signal and a value 813 for the second frequency of the second signal, based on the construction. The second neural network 502 may model the received value 811 for the second frequency of the first signal and value 813 for the second frequency of the second signal.

In various embodiments, the audio filter 307 may further include at least one another neural network corresponding to structures of the first neural network 501 and the second neural network 502. The number of neural networks included in the audio filter 307 is not limited to the aforementioned example.

Figure 9:
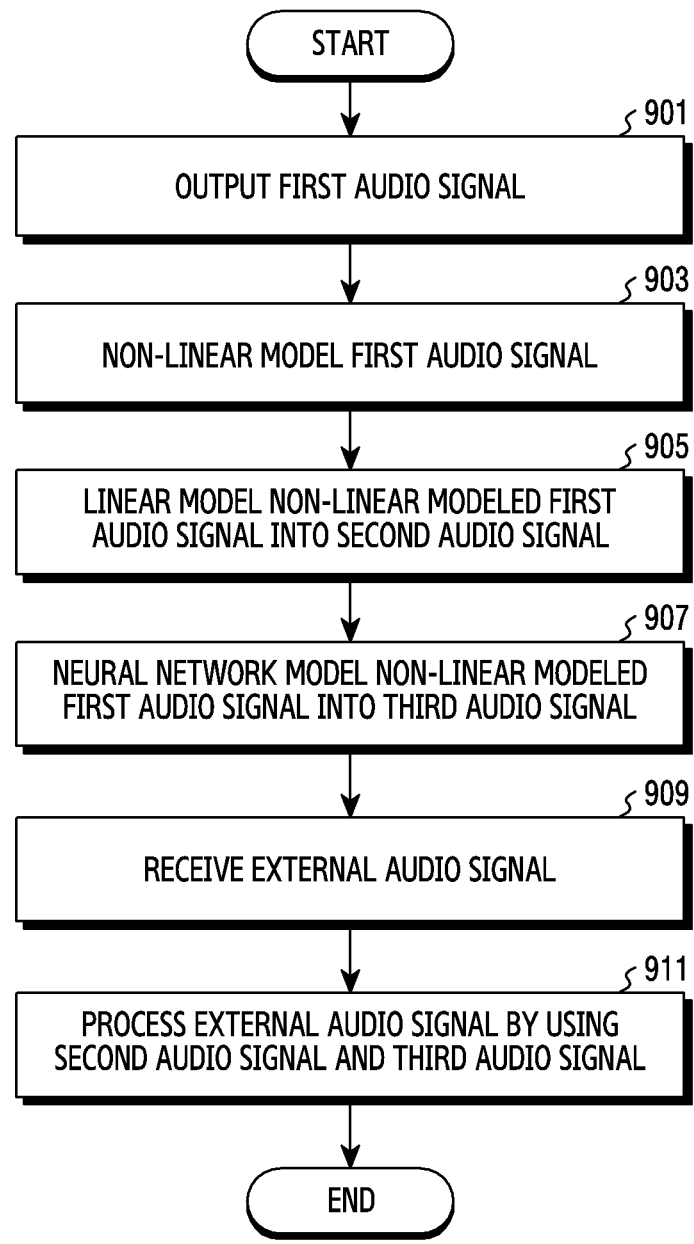
FIG. 9 illustrates another example of an operation of an electronic device for processing an external audio signal according to various embodiments.

FIG. 9 illustrates another example of an operation of an electronic device for processing an external audio signal according to various embodiments.

Referring to FIG. 9, in operation 901, the processor 120 may output a first audio signal. The processor 120 may receive the first audio signal from another electronic device, to output the first audio signal outside the electronic device 101.

In operation 903, the processor 120 may non-linear model the first audio signal. The processor 120 may perform modeling for reflecting an attribute of non-linearity in the first audio signal. In various embodiments, the processor 120 may model the first audio signal into a signal having a first attribute of non-linearity and a signal having a second attribute of non-linearity.

In operation 905, the processor 120 may linear model the non-linear modeled first audio signal into a second audio signal. In various embodiments, the processor 120 may provide the second audio signal, based on the signal (hereinafter, the first signal) having the first attribute of non-linearity and the signal (hereinafter, the second signal) having the second attribute of non-linearity. The second audio signal may include an attribute of linearity. The second audio signal may include all of a residual attribute of non-linearity (i.e., a residual non-linear attribute not reflected in the non-linear modeling) and an attribute of linearity.

In operation 907, the processor 120 may model the non-linear modeled first audio signal into a third audio signal. The processor 120 may model the non-linear modeled first audio signal into the third audio signal for removing a non-linear echo from the external audio signal, based on a neural network operation.

In various embodiments, the non-linear modeled first audio signal may be a signal on a time axis. The processor 120 may transform the non-linear modeled first audio signal from the time axis to a frequency axis. The processor 120 may divide the first audio signal transformed into the frequency axis, on a per-frequency basis (or a frequency unit, a frequency domain). For example, the first audio signal may be divided into a magnitude value for a first frequency and a magnitude value for a second frequency. The processor 120 may process the first audio signal divided on a per-frequency basis, based on a neural network related with each frequency. In an embodiment, the neural network operation divided and proceeding on the per-frequency basis may be mutually independent. In some embodiments, the first audio signal may include the first signal and the second signal. The processor 120 may transform the first signal and the second signal from the time axis to the frequency axis. The processor 120 may distinguish the first signal and the second signal transformed into the frequency axis, on a per-frequency basis. The processor 120 may process the first signal divided on a per-frequency basis and the second signal divided on a per-frequency basis, based on a neural network related with each frequency.

In operation 909, the processor 120 may receive an external audio signal. The external audio signal may include the first audio signal that is outputted in operation 901. The external audio signal may include a non-linear signal (i.e., a removal target signal) that is provided based on elements (e.g., the speaker, the microphone) included within the electronic device 101.

In operation 911, the processor 120 may process the external audio signal by using the second audio signal and the third audio signal. The processor 120 may perform processing for removing the second audio signal from the external audio signal. The processor 120 may perform processing for removing the third audio signal from the external audio signal. In various embodiments, the processor 120 may be configured to output only a target signal by removing an echo signal, in a scheme of subtracting an echo signal corresponding to the second audio signal and an echo signal corresponding to the third audio signal from the external audio signal.

In various embodiments, the first audio signal, the second audio signal and the external audio signal may be signals on a time axis. After removing the signal corresponding to the second audio signal from the external audio signal, the processor 120 may transform the external audio signal into a frequency axis. The processor 120 may remove the signal corresponding to the third audio signal, from the external audio signal transformed into the frequency axis.

In various embodiments, the third audio signal may include a plurality of output values. For example, the third audio signal may include the first output value for the first frequency and the second output value for the second frequency. The processor 120 may identify the external audio signal which is processed based on the second audio signal, as the value for the first frequency and the value for the second frequency. To remove the third audio signal from the external audio signal which is processed based on the second audio signal, the processor 120 may divide and process, on a per-frequency basis, the external audio signal which is processed based on the second audio signal. For example, the processor 120 may process the value for the first frequency by using the first output value. The processor 120 may process the value for the second frequency by using the second output value.

Operation 905 to operation 909 are not limited to the aforementioned order (or context), and operation 905 to operation 909 may be performed in sequence or in parallel, or be performed according to another context.

Figure 10:
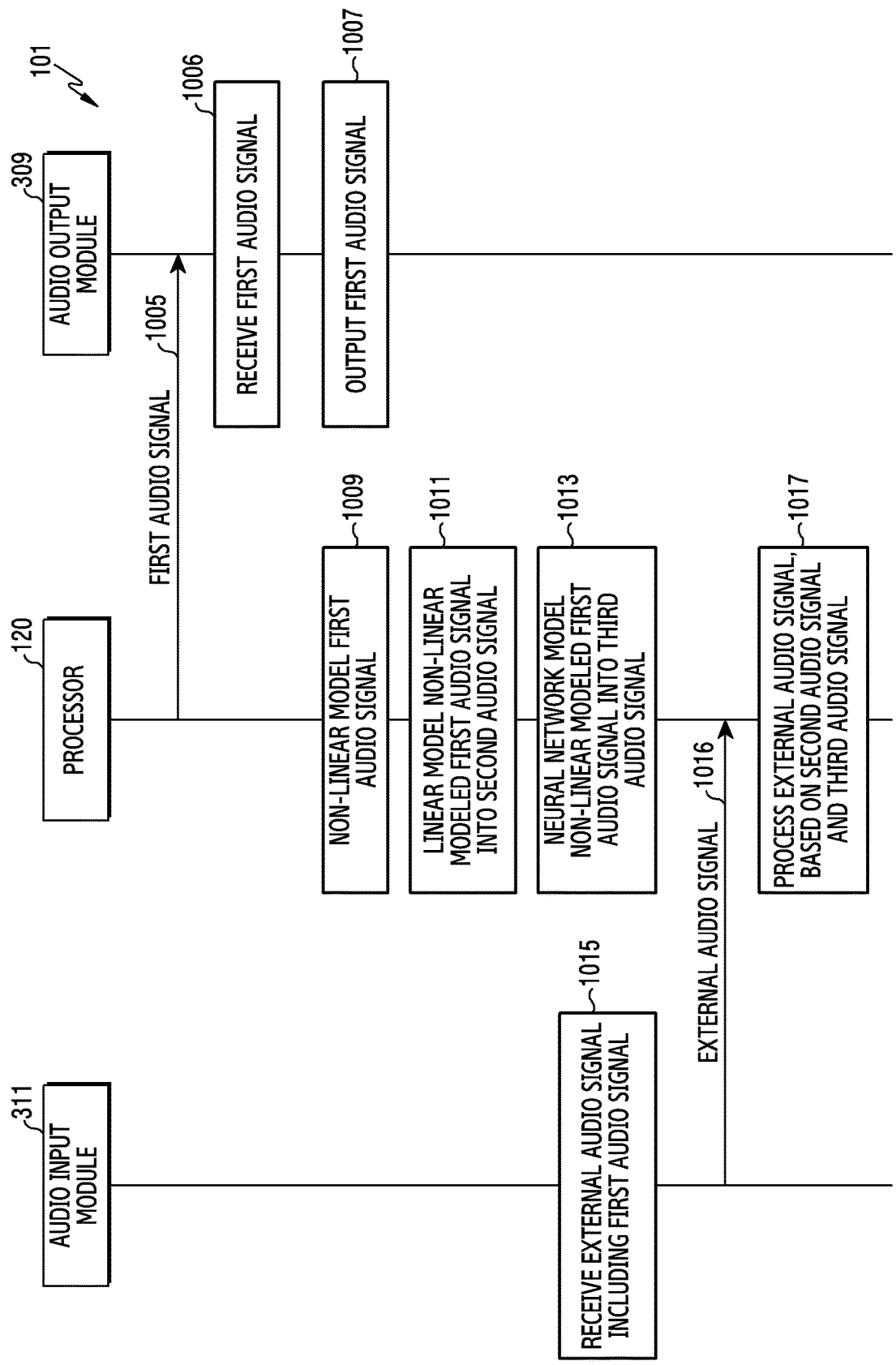
FIG. 10 illustrates an example of a signal flow for processing an external audio signal in an electronic device according to various embodiments.

FIG. 10 illustrates an example of a signal flow for processing an external audio signal in an electronic device according to various embodiments.

Referring to FIG. 10, the electronic device 101 may include the audio output module 309, the audio input module 311, and the processor 120.

In operation 1005, the processor 120 may transmit a first audio signal to the audio output module 309. The processor 120 may perform operation 1005, according as identifying the first audio signal as a signal outputted through the audio output module 309. In some embodiments, the first audio signal may be a signal provided within the electronic device 101. In other some embodiments, the first audio signal may be a signal received from another electronic device.

In operation 1006, the audio output module 309 may receive the first audio signal. The first audio signal may be a signal for outputting through the audio output module 309. The first audio signal may be the form of a pulse code modulation (PCM) signal indicating an analog signal (e.g., a voice) by a digital expression (or digital code).

In operation 1007, the audio output module 309 may output the first audio signal to the external through the speaker. In various embodiments, the first audio signal outputted to the external may be introduced together with a target signal (e.g., a signal corresponding to a user's voice) through a microphone of the audio input module 311.

In operation 1009, the processor 120 may non-linear model the first audio signal. The first audio signal may include an attribute of non-linearity, based on the non-linear modeling.

In operation 1011, the processor 120 may linear model the non-linear modeled first audio signal into a second audio signal. The second audio signal may include an attribute of linearity, based on the linear modeling.

In operation 1013, the processor 120 may neural network model the non-linear modeled first audio signal into a third audio signal. The third audio signal based on the neural network modeling may include an attribute related with a neural network. The neural network may include an attribute of non-linearity.

In operation 1015, the audio input module 311 may receive an external audio signal including the first audio signal. The audio input module 311 may receive the external audio signal including the first audio signal, through the microphone.

In operation 1016, the audio input module 311 may transmit the received external audio signal to the processor 120. The external audio signal may include the first audio signal which is outputted through the audio output module 309 and is introduced into the audio input module 311, and a target signal which is inputted by a user.

In operation 1017, the processor 120 may process the external audio signal, based on the second audio signal and the third audio signal. To remove a signal (e.g., an echo signal having an attribute of linearity) corresponding to the second audio signal and a signal (e.g., an echo signal having an attribute of non-linearity) corresponding to the third audio signal from the external audio signal, the processor 120 may process the external audio signal. In some embodiments, the processor 120 may sequentially perform the processing related with the second audio signal and the processing related with the third audio signal. For example, after the processing related with the second audio signal is completed, the processor 120 may initiate the processing related with the third audio signal. In other some embodiments, after the processing related with the second audio signal is completed, the processor 120 may transform the processed external audio signal from the time axis to the frequency axis. The processor 120 may process the external audio signal transformed into the frequency axis, based on the third audio signal.

Figure 11:
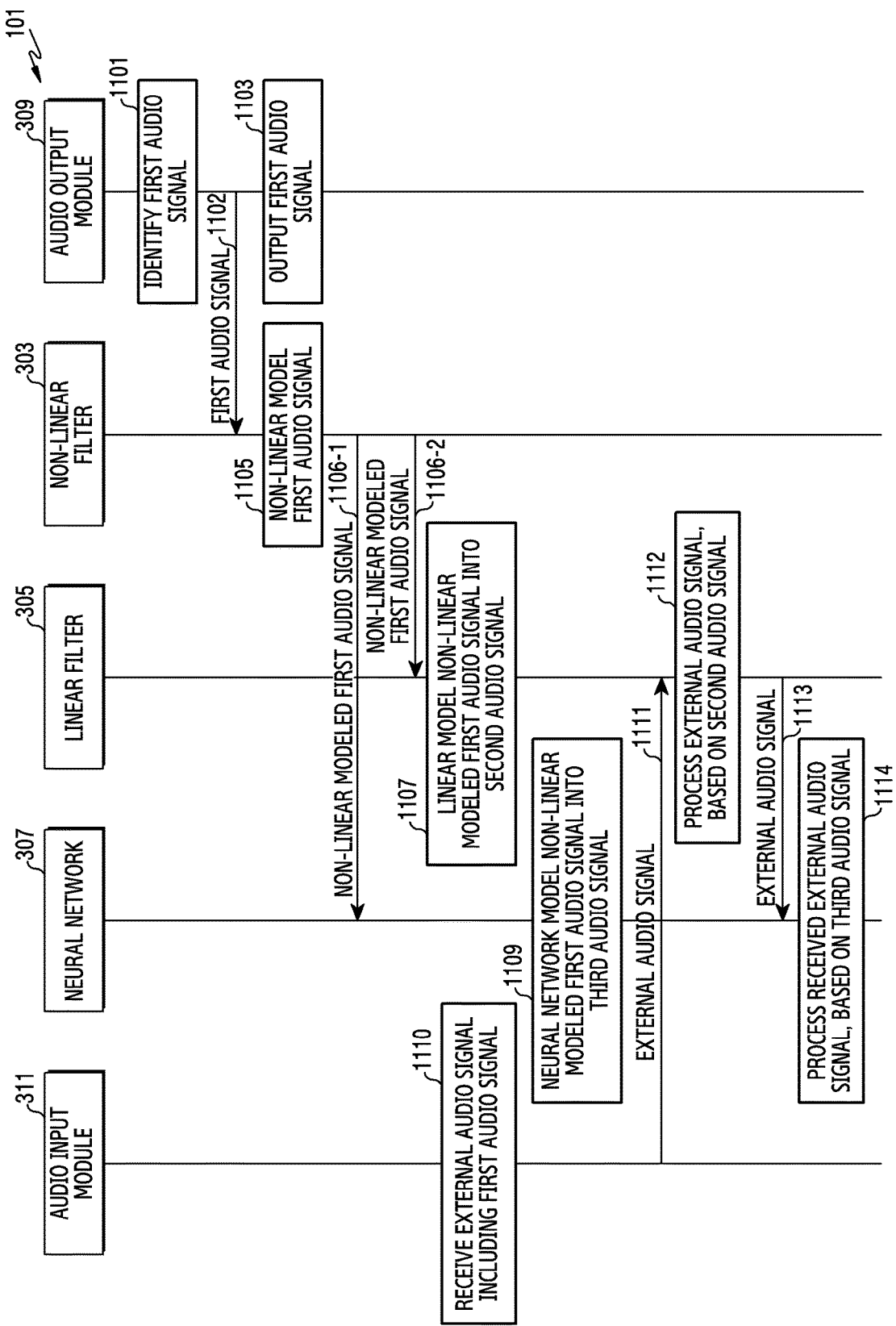
FIG. 11 illustrates another example of a signal flow for processing an external audio signal in an electronic device according to various embodiments.

FIG. 11 illustrates another example of a signal flow for processing an external audio signal in an electronic device according to various embodiments.

Referring to FIG. 11, the electronic device 101 may include the audio input module 311, the neural network 307, the linear filter 305, the non-linear filter 303, and the audio output module 309. In accordance with an embodiment, the neural network 307 may correspond to the audio filter 307. In various embodiments, the constituent elements (e.g., the audio input module 311, the neural network 307, the linear filter 305, the non-linear filter 303 or the audio output module 309) may each include a sub processor for execution of an operation. In accordance with an embodiment, the constituent elements may each be connected with the sub processor, to perform an operation.

In operation 1101, the audio output module 309 may receive a first audio signal. In various embodiments, the first audio signal may be a signal converted into a signal suitable to be outputted through the audio output module 309, based on the processor 120. To be outputted through the audio output module 309, the converted signal (e.g., the first audio signal) may be transmitted from the processor 120 to the audio output module 309. The first audio signal may be the form of a pulse code modulation (PCM) signal indicating an analog signal (e.g., a voice) by a digital expression (or digital code).

In operation 1102, the audio output module 309 may transmit the first audio signal to the non-linear filter 303. In various embodiments, the audio output module 309 may transmit the first audio signal, which is a signal to be outputted through the audio output module 309, to the non-linear filter 303. In some embodiments, the audio output module 309 may transmit the first audio signal to the non-linear filter 303, based on identifying that the first audio signal is outputted. In response to the non-linear filter 303 including a plurality of non-linear filters, the audio output module 309 may transmit the first audio signal to each of the plurality of non-linear filters.

In operation 1103, the audio output module 309 may output the first audio signal to the external through the speaker. Operation 1103 may be performed in parallel with operation 1102, or irrespective of order. In various embodiments, the first audio signal outputted to the external may be introduced, together with a target signal (e.g., a signal corresponding to a user's voice), through a microphone of the audio input module 311.

In operation 1105, the non-linear filter 303 may non-linear model the received first audio signal. By the non-linear modeling, the first audio signal may include an attribute of non-linearity.

In operation 1106-1, the non-linear modeled first audio signal may be transmitted from the non-linear filter 303 to the neural network 307. In operation 1106-2, the non-linear modeled first audio signal may be transmitted from the non-linear filter 303 to the linear filter 305. In accordance with an embodiment, operation 1106-1 and operation 1106-2 may be performed in parallel or irrespective of order.

Though not illustrated, in various embodiments, the electronic device 101 may further include an FFT unit for doing FFT processing. After the first audio signal is non-linear modeled by the non-linear filter 303, the FFT unit may transform the non-linear modeled first audio signal from the time axis to the frequency axis. The FFT unit may transmit the external audio signal transformed into the frequency axis, to the linear filter 305 and the neural network 307, in parallel or irrespective of order.

In operation 1107, the linear filter 305 may linear model the non-linear modeled first audio signal into a second audio signal. The second audio signal may include an attribute of linearity, based on the linear modeling.

In operation 1109, the neural network 307 may neural network model the non-linear modeled first audio signal into a third audio signal. The third audio signal based on the neural network modeling may include an attribute related with a neural network. The neural network may include an attribute of non-linearity.

In operation 1110, the audio input module 311 may receive the external audio signal including the first audio signal that is outputted through the audio output module 309 in operation 1103. The external audio signal may further include a non-linear signal. The non-linear signal may be a signal which is provided based on an element, etc. included within the electronic device 101. In various embodiments, operation 1110 may correspond to operation 1015 of FIG. 10.

In operation 1111, the received external audio signal received through the audio input module 311 may be transmitted to the linear filter 305. In various embodiments, operation 1111 may correspond to operation 1016 of FIG. 10.

In operation 1112, the linear filter 305 may process the received external audio signal, based on the second audio signal. To remove a signal (e.g., an echo signal having an attribute of linearity) corresponding to the second audio signal from the received external audio signal, the linear filter 305 may process the external audio signal.

In operation 1113, the external audio signal processed through the linear filter 305 may be transmitted to the neural network 307. The external audio signal for which the processing for removing the signal (e.g., the echo signal having the attribute of linearity) corresponding to the second audio signal is performed through the linear filter 305 may be transmitted to the neural network 307.

In operation 1114, the neural network 307 may receive the processed external audio signal from the linear filter 305. The neural network 307 may process the received external audio signal, based on the third audio signal of operation 1109. The neural network 307 may perform the processing for removing the signal (e.g., the echo signal having the attribute of non-linearity) corresponding to the third audio signal from the external audio signal.

Though not illustrated, in various embodiments, after the processing related with the second audio signal is completed by the linear filter 305, the FFT unit may transform the processed external audio signal from the time axis to the frequency axis. The neural network 307 may process the external audio signal transformed into the frequency axis, based on the third audio signal.

Though not illustrated, in accordance with various embodiments, operation 1111 and operation 1113 may be performed by the processor 120. The external audio signal disclosed in operation 1110 may be transmitted to the processor 120.

Though not illustrated, in various embodiments, the linear filter 305 and the non-linear filter 303 may be included in the AEC. The AEC may perform operation 1111. The AEC may transmit the external audio signal which is processed based on operation 1111, to the neural network 307 or the processor 120. The neural network 307 or the processor 120 may process the external audio signal, based on the third audio signal. To remove the third audio signal from the external audio signal, the neural network 307 or the processor 120 may process the external audio signal.

Figure 12:
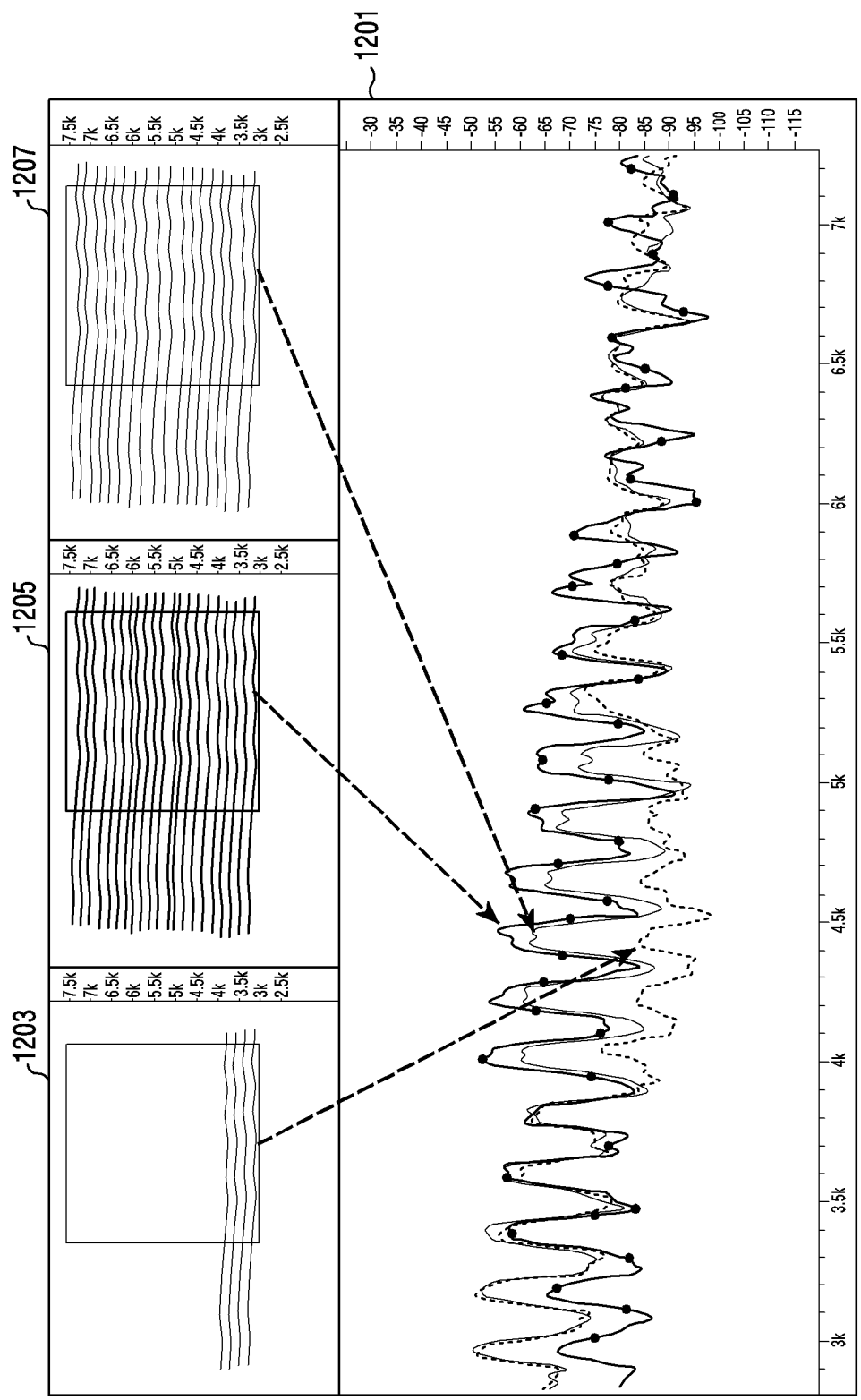
FIG. 12 illustrates an example of an audio signal, an external audio signal, and/or a signal modeled by a non-linear filter according to various embodiments.

FIG. 12 illustrates an example of an audio signal, an external audio signal, and/or a signal modeled by a non-linear filter according to various embodiments.

In various embodiments, the audio signal may correspond to the first audio signal, a signal transmitted from another electronic device to the electronic device 101 through the communication module 190, and/or an audio signal that will be outputted by the audio output module 309. The external audio signal may correspond to a signal sensed by the audio input module 311, a signal received through the audio input module 311, a reverberation of the audio signal, an echo of the audio signal, and/or the like. In response to the non-linear filter 303 including the plurality of non-linear filters, the signal modeled by the non-linear filter may be a signal modeled for one of the plurality of non-linear filters.

Referring to FIG. 12, graph 1203 may illustrate a waveform of an audio signal that will be outputted through the audio output module 309. Graph 1205 may illustrate a waveform of an external audio signal received by the audio input module 311. Graph 1207 may illustrate a waveform of a signal modeled through the non-linear filter 303. In the graph 1203, the graph 1205, and the graph 1207, an X axis may indicate a time, and a Y axis may indicate a frequency. The graph 1203, the graph 1205, and the graph 1207 may be a spectrogram indicating a photograph taken for a spectrum of a signal.

Referring to FIG. 12, in various embodiments, the external audio signal related with the graph 1205 in the graph 1201 may further include a signal not existing in the audio signal related with the graph 1203. The external audio signal may include a high-band harmonic signal. A high-band harmonic component may be a non-linear signal. As illustrated in FIG. 12, the signal modeled by the non-linear filter related with the graph 1207 may reflect a characteristic of the external audio signal.

The graph 1201 includes the audio signal, the external audio signal, and the signal modeled by the non-linear filer. The audio signal illustrated in the graph 1201 may be a signal transforming the graph 1203 from a time axis to a frequency axis. The external audio signal illustrated in the graph 1201 may be a signal transforming the graph 1205 from the time axis to the frequency axis. The signal modeled by the non-linear filter illustrated in the graph 1201 may be a signal transforming the graph 1207 from the time axis to the frequency axis. Referring to the graph 1201, a curve of the graph 1207 may more clearly reflect a curve of the graph 1205 than a curve of the graph 1203 does. In accordance with an embodiment, in the graph 1201, an X axis may indicate a frequency, and a Y axis may indicate a signal magnitude.

Figure 13:
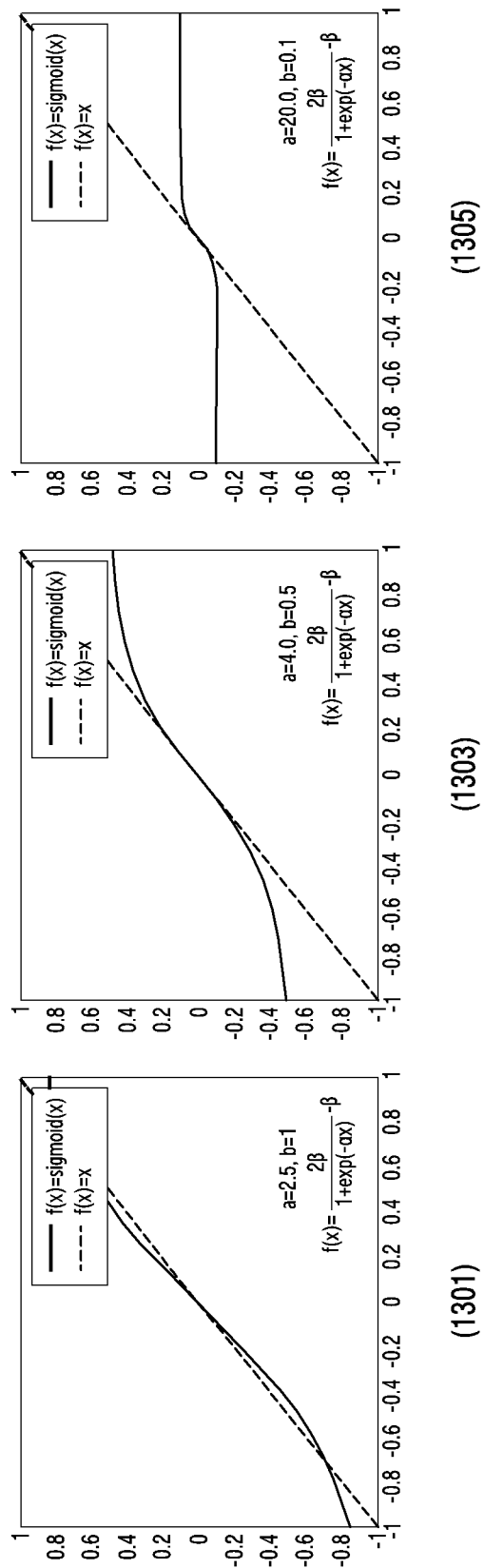
FIG. 13 illustrates an example of a sigmoid function for reflecting an attribute of non-linearity according to various embodiments.

FIG. 13 illustrates an example of a sigmoid function for reflecting an attribute of non-linearity according to various embodiments.

Referring to FIG. 13, in various embodiments, the sigmoid function may include at least one of graph 1301, graph 1303, and graph 1305. The sigmoid function may be determined as in Equation below.

$$\text{sigmoid}(x) = \frac{2b}{1 + e^{-ax}} - b \quad \text{[Equation 1]}$$

Herein, the 'sigmoid (x)' refers a sigmoid function, and the 'e' refers an irrational number 'e' that is an approximate value 2.718281828 . . . being a base of the natural logarithm, and the 'a' and the 'b' refer arbitrary numbers. Through the 'a' and the 'b', an attribute of the sigmoid function may be identified. The 'a' and the 'b' may be parameters of the sigmoid function.

In the graph 1301, the 'a' may be 2.5, and the 'b' may be 1. In the graph 1303, the 'a' may be 4, and the 'b' may be 0.5. In the graph 1305, the 'a' may be 20, and the 'b' may be 0.1. A change between an inputted signal and an outputted signal in the graph 1301 may be least among the graphs 1301, 1303, and 1305. A change between an inputted signal and an outputted signal in the graph 1305 may be greatest among the graphs 1301, 1303, and 1305.

In various embodiments, the non-linear filter 303 may include a plurality of non-linear filters. The plurality of non-linear filters may be expressed by different sigmoid functions, respectively.

Figure 14:
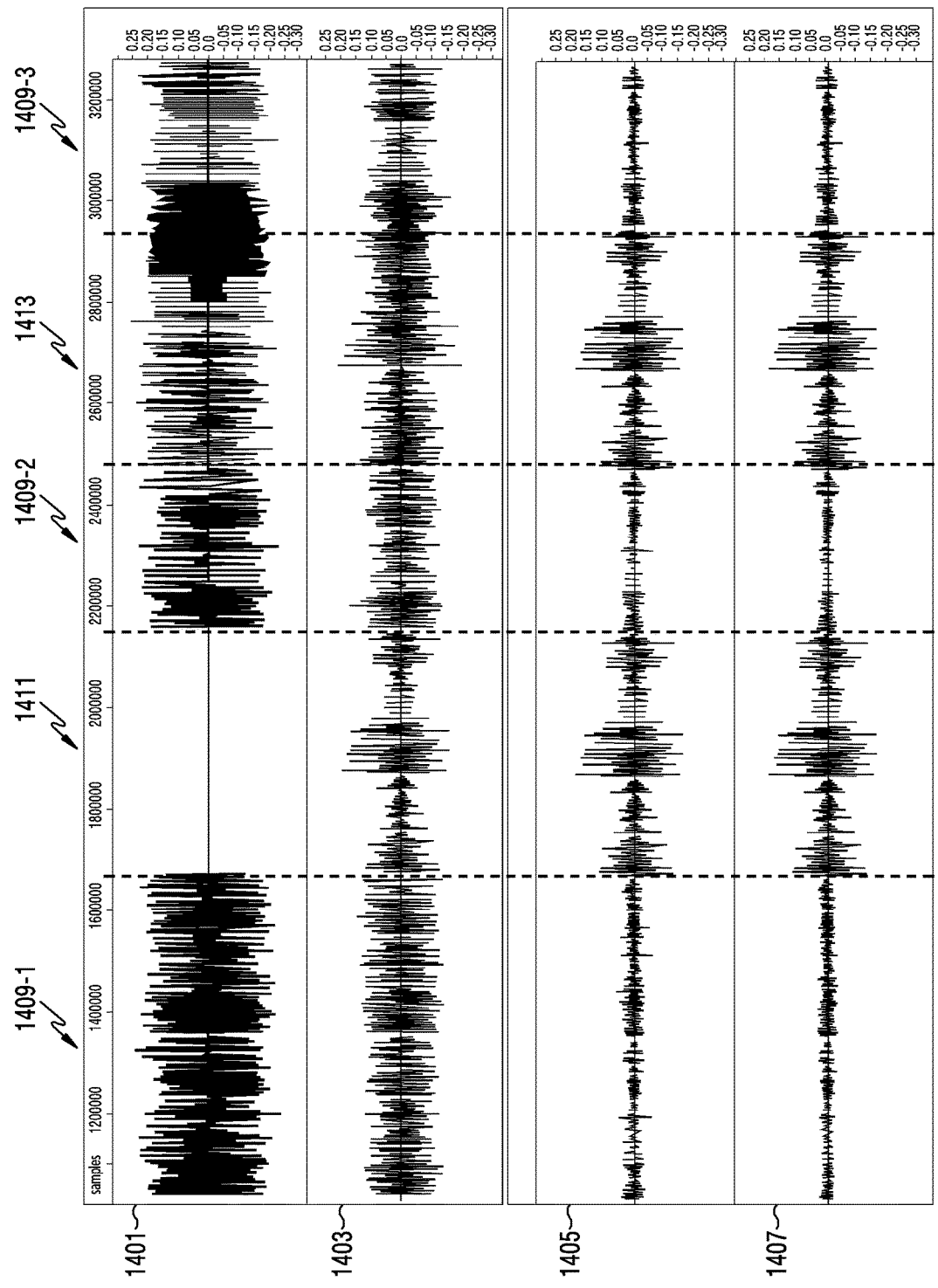
FIG. 14 illustrates an example of signals for an electronic device according to various embodiments.

FIG. 14 illustrates an example of signals for an electronic device according to various embodiments.

Graph 1401 may indicate an audio signal that will be outputted by the audio output module 309. The audio signal may be a signal that is identified by the audio output module 309. In accordance with an embodiment, the audio signal may be a voice signal of a user of another electronic device received 10 through the another electronic device in response to making a phone call through the electronic device.

Graph 1403 may indicate sound signals outside the electronic device 101 inputted through the audio input module 311. The outside sound signals may include an external audio signal and/or a voice signal of a user of the electronic device 101. In accordance with an embodiment, in response to the user of the electronic device 101 making a phone call in a speaker phone mode, the audio output module 309 may output the voice signal of the user of the another electronic device. The external audio signal may be a signal that the outputted voice signal is inputted through the audio input module 311.

Graph 1405 may indicate an audio signal of the graph 1401 processed by the linear filter 305 in response to the non-linear filter 303 not being included in the electronic device 101. The graph 1401 may be a signal in which an attribute of linearity is all reflected.

Graph 1407 may indicate a signal of the graph 1401 processed by the non-linear filter 303 and the linear filter 305. The graph 1401 may be a signal in which an attribute of non-linearity and an attribute of linearity are all reflected.

In accordance with an embodiment, X axes of the graph 1401 to the graph 1407 may indicate a time, and Y axes thereof may indicate a signal amplitude.

A duration 1409-1, a duration 1409-2, and a duration 1409-3 may be durations which include only an outputted voice signal of a user (hereinafter, a far-end speaker) of another electronic device. The voice signal of the far-end speaker may be the external audio signal. The electronic device 101 according to various embodiments may remove the voice signal of the far-end speaker, in the duration 1409-1, the duration 1409-2, and/or the duration 1409-3. In the duration 1409-1, the duration 1409-2, and/or the duration 1409-3, it may be shown that the graph 1407 more effectively removes the voice signal of the far-end speaker than the graph 1405 does.

A duration 1411 may be a duration which includes only a voice signal of a user (hereinafter, a near-end speaker) of the electronic device 101. For example, in response to the electronic device 101 making a phone call in a speaker phone mode, the duration 1411 may be a duration in which only the near-end speaker speaks. In the duration 1411, in a comparison of the graph 1401 and the graph 1403, because only the voice signal of the near-end speaker exists, only the graph 1403 may include a signal. In various embodiments, the electronic device 101 may transmit the voice signal of the near-end speaker to another electronic device. The voice signal of the near-end speaker should be transmitted to the another electronic device, without distortion.

A duration 1413 may be a duration which includes all of the voice signal of the far-end speaker and the voice signal of the near-end speaker. In the duration 1413, the electronic device 101 may remove the voice signal of the far-end speaker. The electronic device 101 according to various embodiments may remove the voice signal of the far-end speaker, and transmit only the voice signal of the near-end speaker to the another electronic device.

Figure 15:
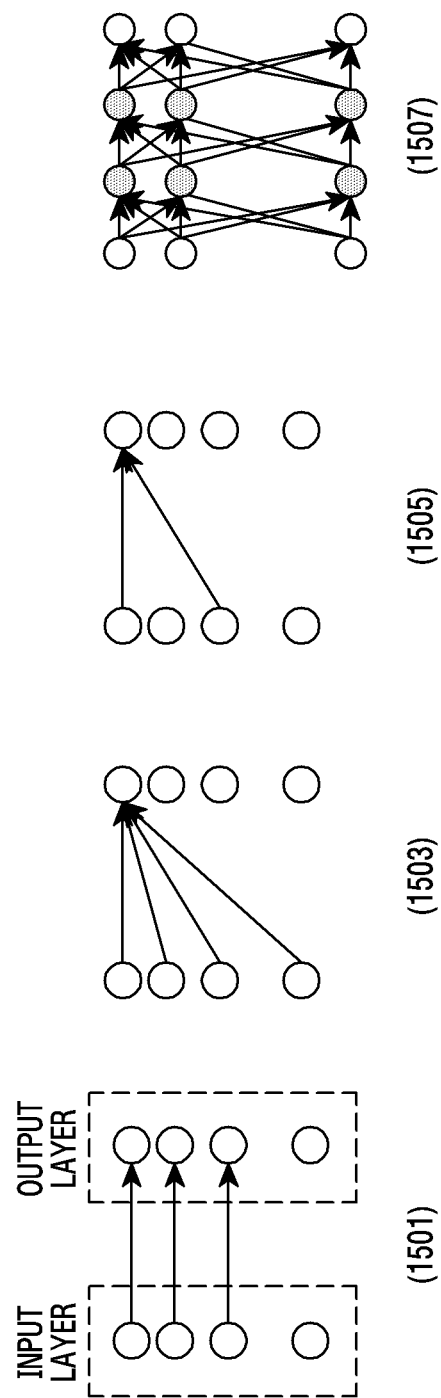
FIG. 15 illustrates an example of an audio filter included in an electronic device according to various embodiments.

FIG. 15 illustrates an example of an audio filter included in an electronic device according to various embodiments.

Referring to FIG. 15, in various embodiments, filters 1501, 1503, 1505, and 1507 may model (or filter) input values in various schemes. Herein, the input value may be a value of a signal transformed into a frequency axis. The input values may be inputted to input nodes of the filters, respectively. The input values may be modeled based on the input. For example, the filters 1501, 1503, 1505, and 1507 may perform modeling for an inputted signal, based on a neural network operation. The filters may perform the neural network operation, based on an operation of transmitting the inputted signals from the input nodes of the filters to the output nodes of the filters.

In various embodiments, the number of the nodes included in an input layer of FIG. 15 may correspond to the number of the plurality of audio filters included in the audio filter 307.

In various embodiments, magnitude modeling may be performed based on the audio filter. The magnitude modeling may include an operation of indicating the received signal by a magnitude corresponding to each frequency, based on transforming the received signal from the time axis to the frequency axis.

In various embodiments, the filter 1501 may represent a filter for linear magnitude regression. The filter 1501 may perform modeling for each frequency, correspondingly to an inputted frequency.

In various embodiments, the filter 1503 may model a feature of non-linearity in consideration of an input of the whole frequency, in order to model a designated frequency.

In various embodiments, the filter 1505 may model a feature of non-linearity in consideration of an input of a partial frequency, in order to model a designated frequency. The filter 1505 may be a medium form of the filter 1501 and the filter 1503.

The filter 1507 may include a hidden node between an input node and an output node. In various embodiments, to model a frequency, the filter 1507 may model a feature of non-linearity in consideration of the whole frequency inputted through the input node and the hidden node. The filter 1507 may effectively model a feature of non-linearity into an inputted signal.

In various embodiments, the audio filter may correspond to one of the filter 1501, the filter 1503, the filter 1505, and the filter 1507.

Figure 16:
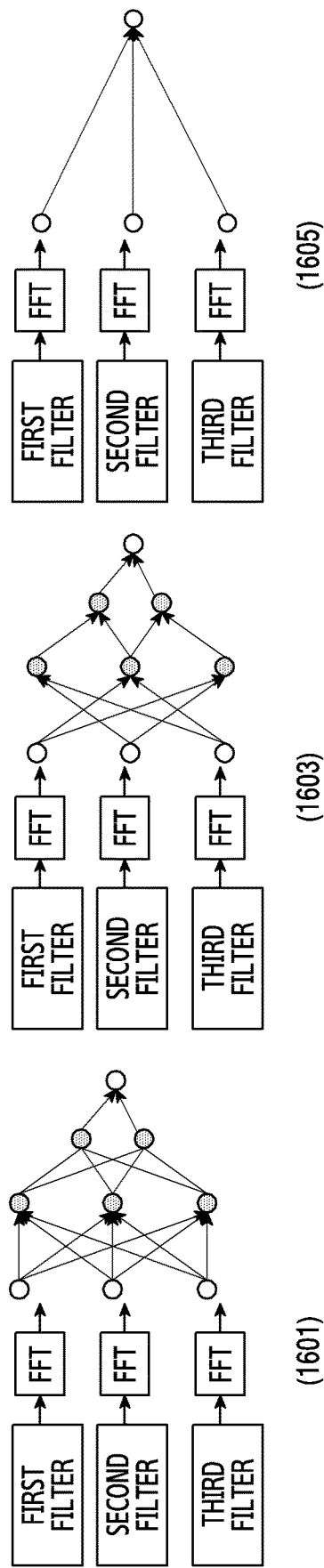
FIG. 16 illustrates another example of an audio filter included in an electronic device according to various embodiments.

FIG. 16 illustrates another example of an audio filter included in an electronic device according to various embodiments.

Referring to FIG. 16, in various embodiments, the audio filter 307 may include a plurality of audio filters. The plurality of audio filters may be a construction corresponding to one of a filter 1601, a filter 1602 and a filter 1603. For example, the first audio filter may correspond to one of the filter 1601, the filter 1602 and the filter 1603. Inputs to the filter 1601, the filter 1602 and the filter 1603 may be divided and inputted on a per-frequency basis.

In various embodiments, the signals divided and inputted on the per-frequency basis may be modeled into a first output value through the input node, the hidden node, and the output node. The filter 1601, the filter 1602 and/or the filter 1603 shown in FIG. 16 indicate various methods for modeling signals inputted to the input node. The filter 1601, the filter 1602 and/or the filter 1603 may effectively model an attribute of non-linearity into the inputted signals. The modeling may be denoted as a neural network operation.

Figure 17:
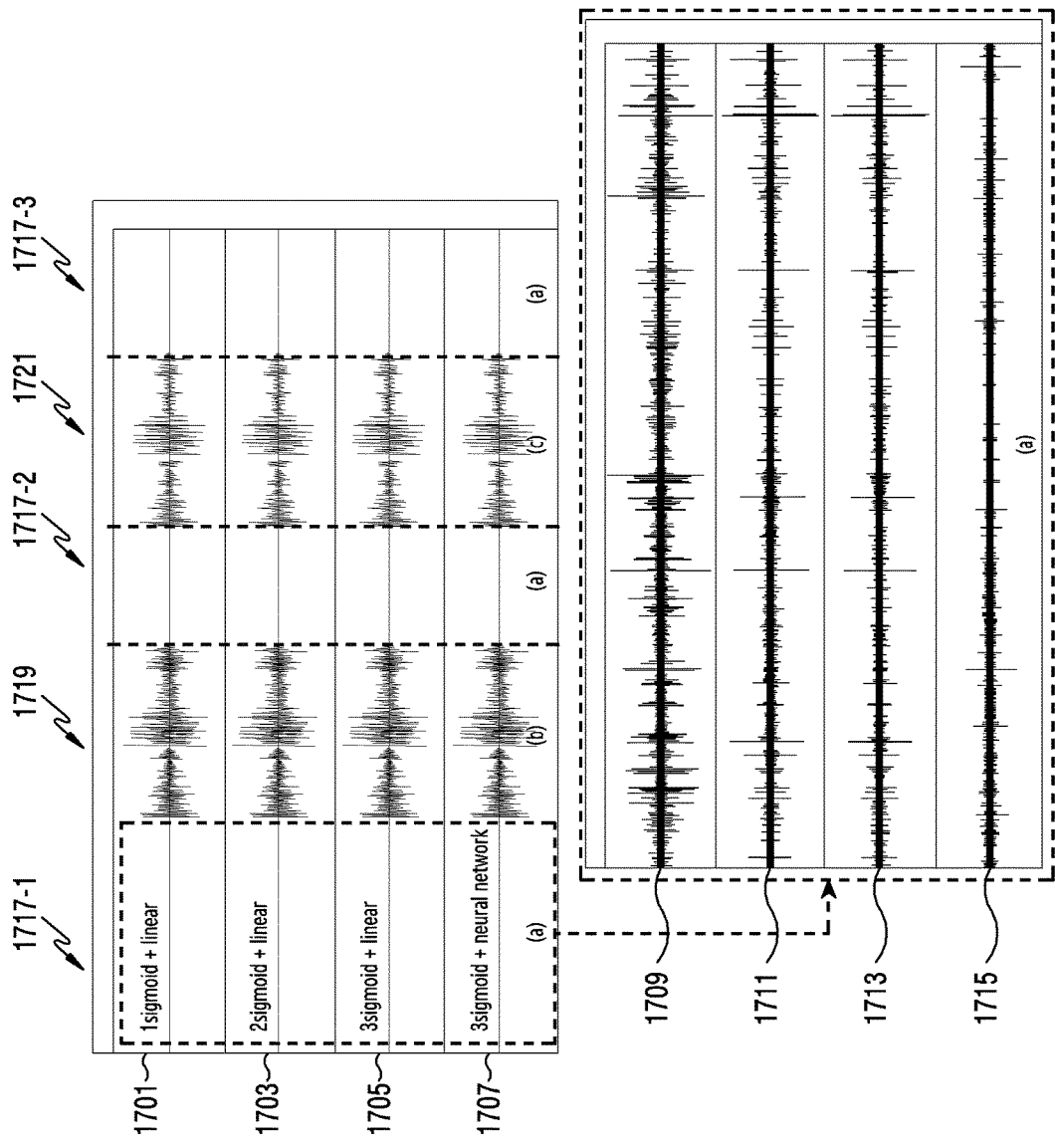
FIG. 17 illustrates another example of signals for an electronic device according to various embodiments.

FIG. 17 illustrates another example of signals for an electronic device according to various embodiments. Graphs shown in FIG. 17 may include the examples for the graph 1407 of FIG. 14. Referring to FIG. 17, signals processed based on the non-linear filter 303 are included.

In various embodiments, signals indicated by the graphs may be a signal which includes a residual echo remaining after processing for removing the echo signal is completed.

Graph 1701 illustrates an external audio signal which is modeled based on a single non-linear filter and the linear filter 305, in response to the non-linear filter 303 including the single non-linear filter, according to various embodiments.

Graph 1703 illustrates an external audio signal which is modeled based on two non-linear filters and the linear filter 305, in response to the non-linear filter 303 including the two non-linear filters, according to various embodiments.

Graph 1705 illustrates an external audio signal which is modeled based on three non-linear filters and the linear filter 305, in response to the non-linear filter 303 including the three non-linear filters, according to various embodiments.

Graph 1707 illustrates an external audio signal which is modeled based on three non-linear filters, the linear filter 305 and the audio filter 307, in response to the non-linear filter 303 including the three non-linear filters and the audio filter 307, according to various embodiments.

Referring to FIG. 17, graphs 1709 to 1715 illustrate the signals included in the graphs 1701 to 1707, in a duration 1717-1. In a comparison of the graphs 1709 to 1715, the graph 1715 among the graphs 1709 to 1715 discloses a signal most effectively removing the external audio signal.

Figure 18:
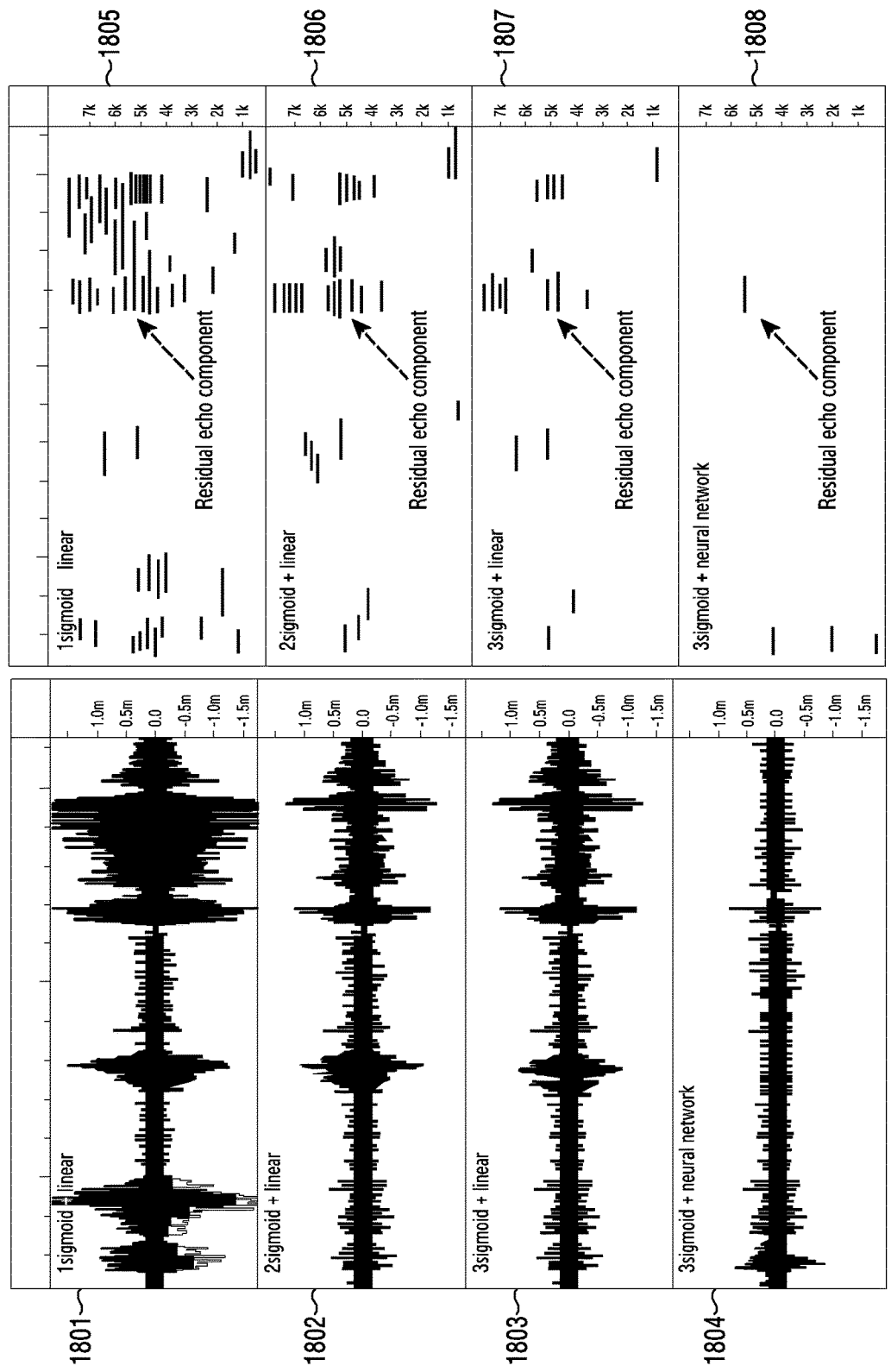
FIG. 18 illustrates a further example of signals for an electronic device according to various embodiments.

FIG. 18 illustrates a further example of signals for an electronic device according to various embodiments.

Referring to FIG. 18, graph 1801 to graph 1804 magnify and illustrate a part of the graphs 1701 to 1707 of FIG. 17. In various embodiments, the graphs 1801 to 1804 may indicate a signal during one second (s). In a comparison of the graphs 1801 to 1804, a signal disclosed through the graph 1804 may be a signal most modeling the external audio signal.

In various embodiments, signals indicated by the graphs may be signals which include a residual echo remaining after processing for removing the external audio signal is completed.

Graphs 1805 to 1808 indicate signals shown in the graphs 1801 to 1804 by a spectrogram. In a comparison of the graphs 1805 to 1808, the graph 1808 includes the least residual echo. In various embodiments, the external audio signal may be effectively modeled by the three non-linear filters, the linear filter 305 and the audio filter 307.

In various embodiments, the electronic device 101 may include the three non-linear filters, the linear filter 305, and/or the audio filter 307. The electronic device 101 may remove the external audio signal through the three non-linear filters, the linear filter 305, and/or the audio filter 307. The number of filters (e.g., the non-linear filter 303, the linear filter 305 or the audio filter 307) included in the electronic device 110 is not limited to the aforementioned example. For example, the electronic device 101 may include a plurality of non-linear filters, a plurality of linear filters, or a plurality of audio filters.

In various embodiments, a method of the electronic device 101 may include identifying a first audio signal that will be outputted through the audio output module 309, providing a first signal into which the first audio signal is processed by using a first filter having a first attribute of non-linearity and a second signal into which the first audio signal is processed by using a second filter having a second attribute of non-linearity, outputting the first audio signal through the audio output module, acquiring an external audio signal comprising the first audio signal of the electronic device, through an audio input module, acquiring a first output value through a first input channel of an audio filter in which a first weight having a first non-linear characteristic is applied to a magnitude value corresponding to a first frequency among the first signal and a magnitude value corresponding to the first frequency among the second signal, acquiring a second output value through a second input channel of the audio filter in which a second weight having a second non-linear characteristic, distinct from the first weight, is applied to a magnitude value corresponding to a second frequency among the first signal and a magnitude value corresponding to the second frequency among the second signal, and providing a second audio signal, based at least on a first difference value between the magnitude value corresponding to the first frequency of the external audio signal and the first output value and a second difference value between the magnitude value corresponding to the second frequency of the external audio signal and the second output value.

While a detailed description of the present disclosure describes a concrete embodiment, it is undoubted that various modifications are available without departing from the scope of the disclosure. Therefore, the scope of the present disclosure should not be limited and defined to the explained embodiment and should be defined by not only the scope of claims mentioned below but also equivalents to the scope of these claims.

And, exemplary embodiments disclosed in the specification and drawings only suggest specific examples so as to easily explain the content of the present disclosure and help the understanding thereof, and are not to limit the scope of the present disclosure. Accordingly, the scope of the present disclosure should be construed as including all modified or changed forms that are drawn on the basis of the technological spirit of the present disclosure, besides the exemplary embodiments disclosed herein.

What is claimed is:

1. An electronic device comprising:
   an audio input module;
   an audio output module; and
   a processor,
   wherein the processor is configured to:
   identify a first audio signal that will be outputted through the audio output module;
   provide a first signal into which the first audio signal is processed by using a first filter having a first attribute of non-linearity and a second signal into which the first audio signal is processed by using a second filter having a second attribute of non-linearity;
   output the first audio signal through the audio output module;
   acquire an external audio signal comprising the first audio signal of the electronic device, through the audio input module;
   acquire a first output value through a first input channel of an audio filter in which a first weight having a first non-linear characteristic is applied to a magnitude value corresponding to a first frequency among the first signal and a magnitude value corresponding to the first frequency among the second signal;
   acquire a second output value through a second input channel of the audio filter in which a second weight having a second non-linear characteristic, distinct from the first weight, is applied to a magnitude value corresponding to a second frequency among the first signal and a magnitude value corresponding to the second frequency among the second signal; and
   provide a second audio signal, based at least on a first difference value between the magnitude value corresponding to the first frequency of the external audio signal and the first output value and a second difference value between the magnitude value corresponding to the second frequency of the external audio signal and the second output value.

2. The electronic device of claim 1, wherein the processor is configured to adjust the first weight or the second weight wherein the first difference value or the second difference value satisfies a designated condition.

3. The electronic device of claim 1, wherein the processor is configured to provide a third signal into which the first audio signal is processed by using a third filter having an attribute of linearity, and remove at least a part of a signal corresponding to the first audio signal among the acquired external audio signal, based at least on the acquired external audio signal and the third signal.

4. The electronic device of claim 1, wherein the processor is configured to provide a third signal into which the first signal and the second signal are processed by using a third filter having an attribute of linearity, and remove at least a part of a signal corresponding to the first audio signal among the acquired external audio signal, based at least on the acquired external audio signal and the third signal.

5. The electronic device of claim 1, wherein the first attribute of the first filter is configured based at least on a sigmoid function comprising a first parameter, and the second attribute of the second filter is configured based at least on a sigmoid function comprising a second parameter.

6. The electronic device of claim 5, wherein the sigmoid function is identified based on Equation below.

$$\text{sigmoid}(x) = \frac{2b}{1+e^{-ax}} - b$$

wherein the sigmoid (x) refers the sigmoid function, and the 'e' refers an irrational number, and the 'a' and 'b' refer arbitrary numbers.

7. The electronic device of claim 6, wherein the first parameter and the second parameter are distinct by at least one of the 'a' or the 'b'.

8. The electronic device of claim 1, wherein the audio filter is configured based on a first neural network comprised of at least one or more nodes and at least one or more layers correspondingly to the first input channel and a second neural network comprised of at least one or more nodes and at least one or more layers correspondingly to the second input channel.

9. The electronic device of claim 8, wherein the first weight comprises respective weight values for the at least one or more nodes or at least one or more layers of the first neural network, and the second weight comprises respective weight values for the at least one or more nodes or at least one or more layers of the second neural network.

10. A method of an electronic device, comprising
    identifying a first audio signal that will be outputted through an audio output module;
    providing a first signal into which the first audio signal is processed by using a first filter having a first attribute of non-linearity and a second signal into which the first audio signal is processed by using a second filter having a second attribute of non-linearity;
    outputting the first audio signal through the audio output module;
    acquiring an external audio signal comprising the first audio signal of the electronic device, through an audio input module;
    acquiring a first output value through a first input channel of an audio filter in which a first weight having a first non-linear characteristic is applied to a magnitude value corresponding to a first frequency among the first signal and a magnitude value corresponding to the first frequency among the second signal;
    acquiring a second output value through a second input channel of the audio filter in which a second weight having a second non-linear characteristic, distinct from the first weight, is applied to a magnitude value corresponding to a second frequency among the first signal and a magnitude value corresponding to the second frequency among the second signal; and providing a second audio signal, based at least on a first difference value between the magnitude value corresponding to the first frequency of the external audio signal and the first output value and a second difference value between the magnitude value corresponding to the second frequency of the external audio signal and the second output value.

11. The method of claim 10, comprising adjusting the first weight or the second weight wherein the first difference value or the second difference value satisfies a designated condition.

12. The method of claim 10, comprising providing a third signal into which the first audio signal is processed by using a third filter having an attribute of linearity, and removing at least a part of a signal corresponding to the first audio signal among the acquired external audio signal, based at least on the acquired external audio signal and the third signal.

13. The method of claim 10, comprising:
providing a third signal into which the first signal and the second signal are processed by using a third filter having an attribute of linearity; and
removing at least a part of a signal corresponding to the first audio signal among the acquired external audio signal, based at least on the acquired external audio signal and the third signal.

14. The method of claim 10, comprising identifying the first attribute of the first filter, based at least on a sigmoid function comprising a first parameter, and identifying the second attribute of the second filter, based at least on a sigmoid function comprising a second parameter.

15. The method of claim 14, comprising identifying the sigmoid function, based on Equation below.

$$\text{sigmoid}(x) = \frac{2b}{1 + e^{-ax}} - b$$

wherein the sigmoid (x) refers the sigmoid function, and the 'e' refers an irrational number, and the 'a' and 'b' refer arbitrary numbers.

16. The method of claim 15, wherein the first parameter and the second parameter are distinct by at least one of the 'a' or the 'b'.

17. The method of claim 10, wherein the audio filter is configured based on a first neural network comprised of at least one or more nodes and at least one or more layers correspondingly to the first input channel and a second neural network comprised of at least one or more nodes and at least one or more layers correspondingly to the second input channel.

18. The method of claim 17, wherein the first weight comprises respective weight values for the at least one or more nodes or at least one or more layers of the first neural network, and the second weight comprises respective weight values for the at least one or more nodes or at least one or more layers of the second neural network.

19. An electronic device comprising:
an audio input module;
an audio output module;
a memory storing instructions; and
at least one processor,
wherein the at least one processor is configured to execute the stored instructions so as to:
output a first audio signal through the audio output module;
model the first audio signal through a non-linear filter, based on an attribute of non-linearity;
model the first audio signal modeled based on the attribute of non-linearity, into a second audio signal, based on, an attribute of linearity through a linear filter, and convert the first audio signal modeled based on the attribute of non-linearity, into a signal based on frequency, the signal including a first signal corresponding to a first frequency and a second signal corresponding to a second frequency;
transmit the signal to a neural network;
model the signal into a third audio signal through a neural network based on the frequency; and
in response to receiving an external audio signal related with the first audio signal through the audio input module, process the received external audio signal, based on the second audio signal and the third audio signal.

20. The electronic device of claim 19, wherein the neural network comprises a plurality of weights, and
the plurality of weights are related with an attribute of non-linearity, and the plurality of weights are refined, based on a value inputted to the neural network and a value outputted.

* * * * *